US 6,874,123 B1

(12) United States Patent
DeStefano

(10) Patent No.: US 6,874,123 B1
(45) Date of Patent: Mar. 29, 2005

(54) THREE-DIMENSIONAL MODEL TO FACILITATE USER COMPREHENSION AND MANAGEMENT OF INFORMATION

(75) Inventor: George Francis DeStefano, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 1150 days.

(21) Appl. No.: 09/020,668

(22) Filed: Feb. 9, 1998

(51) Int. Cl.$^7$ ............................................... G06F 7/00
(52) U.S. Cl. ............................... 715/526; 345/782
(58) Field of Search ............................. 707/526, 514, 707/530, 531, 500; 345/350, 782; 715/526, 514, 530, 531, 500

(56) References Cited

U.S. PATENT DOCUMENTS

| | | | |
|---|---|---|---|
| 4,663,616 A | 5/1987 | Christensen | 345/121 |
| 4,752,889 A | 6/1988 | Rappaport et al. | 706/11 |
| 4,860,218 A | 8/1989 | Sleator | 345/340 |
| 4,868,765 A | 9/1989 | Diefendorff | 345/345 |
| 4,964,077 A | 10/1990 | Eisen et al. | 345/337 |
| 5,122,972 A | 6/1992 | Richards et al. | 345/338 |
| 5,186,629 A | 2/1993 | Rohen | 434/114 |
| 5,237,654 A | 8/1993 | Shackelford et al. | 345/804 |
| 5,255,356 A * | 10/1993 | Michelman et al. | 707/504 |
| 5,295,243 A | 3/1994 | Robertson et al. | 345/348 |
| 5,297,249 A * | 3/1994 | Bernstein et al. | 345/356 |
| 5,301,301 A | 4/1994 | Kodosky et al. | 395/500.12 |
| 5,333,254 A | 7/1994 | Robertson | 345/356 |
| 5,335,320 A | 8/1994 | Iwata et al. | 395/704 |
| 5,339,390 A | 8/1994 | Robertson et al. | 345/342 |
| 5,361,361 A | 11/1994 | Hickman et al. | 395/703 |
| 5,363,482 A | 11/1994 | Victor et al. | 345/346 |
| 5,416,903 A | 5/1995 | Malcolm | 345/333 |
| 5,438,662 A * | 8/1995 | Randall | 345/350 |
| 5,461,399 A | 10/1995 | Cragun | 345/145 |
| 5,483,632 A | 1/1996 | Kuwamoto et al. | 345/338 |
| 5,506,937 A | 4/1996 | Ford et al. | 706/11 |

(Continued)

OTHER PUBLICATIONS

Acrobat Reader 3.0 Screendumps, 1996, p. 1–3.*
Wordperfect find/replace screendumps, Fig. 1, p. 1, Mar. 29, 1996.*

(Continued)

*Primary Examiner*—Cesar B Paula
(74) *Attorney, Agent, or Firm*—Wood Herron & Evans LLP

(57) ABSTRACT

A computer system and method of presenting information from a body of knowledge to a user utilize a three-dimensional model to facilitate user comprehension and management of both the specific information in the body of knowledge, as well as the contextual relationship of the information within the body of knowledge as a whole. An abstraction stack is utilized to concurrently display information elements associated with different levels of abstraction for a body of knowledge, with the information elements visually linked with one another in a three dimensional workspace to represent the hierarchical arrangement of the information elements within the scope of the overall body of knowledge. In addition, a computer system and method of authoring a body of knowledge permit a user to input information with the contextual relationship of the information within the overall body of knowledge established in an intuitive and efficient manner. An authoring tool facilitates the creation of a body of knowledge by an author by organizing information into one or more information elements associated with various levels of abstraction. Users are concurrently presented with a plurality of user input elements configured to receive input from a user, with each user input element associated with a particular level of abstraction. Once information is received into a particular user input element, an information element is stored in a computer system and associated with the level of abstraction for the user input element.

19 Claims, 22 Drawing Sheets

U.S. PATENT DOCUMENTS

| | | | | |
|---|---|---|---|---|
| 5,528,744 A | | 6/1996 | Vaughton | 345/340 |
| 5,546,529 A | | 8/1996 | Bowers et al. | 345/348 |
| 5,588,104 A | | 12/1996 | Lanier et al. | 345/326 |
| 5,610,828 A | | 3/1997 | Kodosky et al. | 395/500.12 |
| 5,613,134 A | * | 3/1997 | Lucus et al. | 707/526 |
| 5,615,326 A | | 3/1997 | Orton et al. | 345/356 |
| 5,617,114 A | | 4/1997 | Bier et al. | 345/113 |
| 5,621,874 A | | 4/1997 | Lucas et al. | 707/500 |
| 5,638,523 A | | 6/1997 | Mullet et al. | 345/326 |
| 5,644,740 A | | 7/1997 | Kiuchi | 345/357 |
| 5,657,992 A | | 8/1997 | Bellizzi | 273/273 |
| 5,670,984 A | | 9/1997 | Robertson et al. | 345/425 |
| 5,671,381 A | | 9/1997 | Strasnick et al. | 345/355 |
| 5,689,642 A | * | 11/1997 | Harkins et al. | 709/207 |
| 5,694,561 A | | 12/1997 | Malamud et al. | 345/346 |
| 5,729,704 A | | 3/1998 | Stone et al. | 345/346 |
| 5,751,283 A | | 5/1998 | Smith | 345/342 |
| 5,754,176 A | | 5/1998 | Crawford | 345/338 |
| 5,760,772 A | | 6/1998 | Austin | 345/342 |
| 5,771,042 A | | 6/1998 | Santos-Gomez | 345/342 |
| 5,786,820 A | | 7/1998 | Robertson | 345/357 |
| 5,796,402 A | | 8/1998 | Ellison-Taylor | 345/342 |
| 5,802,514 A | | 9/1998 | Huber | 707/4 |
| 5,808,610 A | | 9/1998 | Benson et al. | 345/342 |
| 5,812,804 A | | 9/1998 | Bates et al. | 395/342 |
| 5,815,151 A | | 9/1998 | Argiolas | 345/342 |
| 5,819,055 A | | 10/1998 | MacLean et al. | 345/342 |
| 5,819,301 A | * | 10/1998 | Rowe et al. | 707/513 |
| 5,825,355 A | | 10/1998 | Palmer et al. | 345/712 |
| 5,835,088 A | | 11/1998 | Jaaskelainen, Jr. | 345/343 |
| 5,856,826 A | | 1/1999 | Craycroft | 345/346 |
| 5,874,962 A | | 2/1999 | de Judicibus et al. | 345/342 |
| 5,874,964 A | | 2/1999 | Gille | 345/356 |
| 5,875,302 A | | 2/1999 | Obhan | 709/225 |
| 5,877,775 A | | 3/1999 | Theisen et al. | 345/440 |
| 5,880,733 A | | 3/1999 | Horvitz et al. | 345/355 |
| 5,890,177 A | | 3/1999 | Moody et al. | 707/511 |
| 5,894,311 A | * | 4/1999 | Jackson | 345/440 |
| 5,900,876 A | * | 5/1999 | Yagita et al. | 345/350 |
| 5,909,690 A | * | 6/1999 | Tanigawa et al. | 707/526 |
| 5,912,668 A | | 6/1999 | Sciammarella et al. | 345/348 |
| 5,920,314 A | | 7/1999 | Maesano et al. | 345/340 |
| 5,937,400 A | | 8/1999 | Au | 706/55 |
| 5,973,697 A | | 10/1999 | Berry et al. | 345/418 |
| 5,973,702 A | | 10/1999 | Orton et al. | 345/433 |
| 6,002,401 A | * | 12/1999 | Baker | 345/349 |
| 6,006,227 A | | 12/1999 | Freeman et al. | 707/7 |
| 6,012,072 A | * | 1/2000 | Lucas et al. | 707/526 |
| 6,031,989 A | * | 2/2000 | Cordell | 395/701 |
| 6,074,427 A | | 6/2000 | Fought et al. | 703/21 |
| 6,088,032 A | * | 7/2000 | Mackinlay | 345/355 |
| 6,097,375 A | * | 8/2000 | Byford | 345/169 |
| 6,144,962 A | | 11/2000 | Weinberg et al. | 707/10 |
| 6,177,933 B1 | * | 1/2001 | Young | 345/333 |

OTHER PUBLICATIONS

Elder et al., "Architecture for Platform and Presentation Independent User Interface for Applications", *IBM® Technical Disclosure Bulletin*, vol. 38, No. 1, pp. 297–302, (1/95).

Brittan, David, "MIT Reporter", *Technology Review*, pp. 12–14, (2/97).

Michelle Shaw, *Microsoft® Office 6–in–1*, Que Corporation, (1994), pp. 10–11, 14–15, 40, and 42–43.

Billington et al., "Application of Sequential Monte Carlo Simulation to Evaluation of Distribution of Composite System Indices", IEE Proceedings, Generation, Transmission and Distribution, vol. 144, No. 2, (Mar. 1997) pp. 87–90.

Furnas, George W., "Generalized Fisheye Views", *Bell Communications Research*, CHI '86 Proceedings (Apr. 1986), pp. 16–22.

* cited by examiner

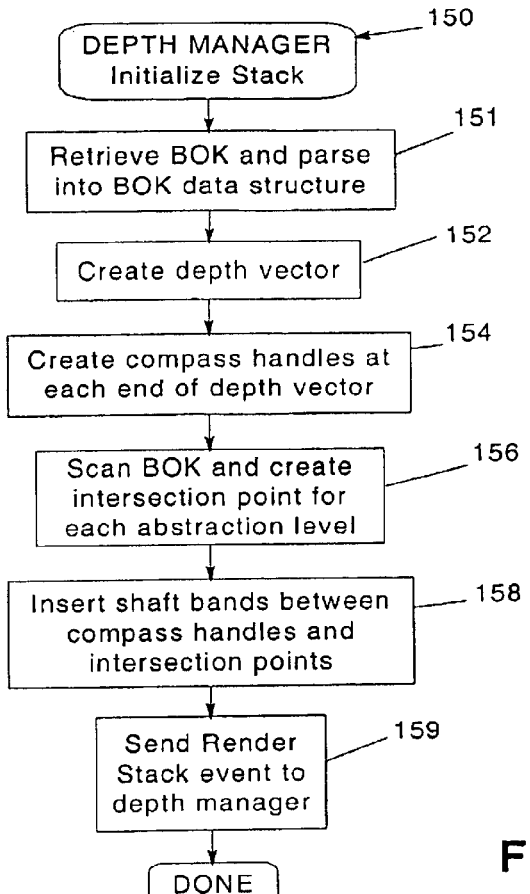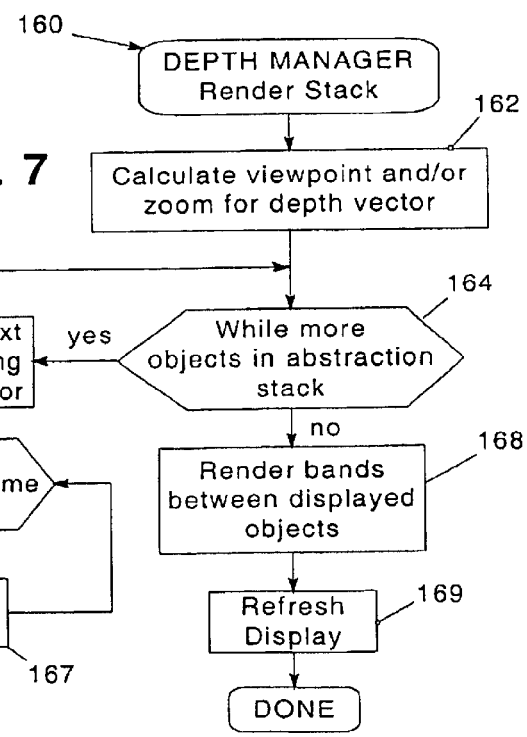
Fig. 6
Fig. 7

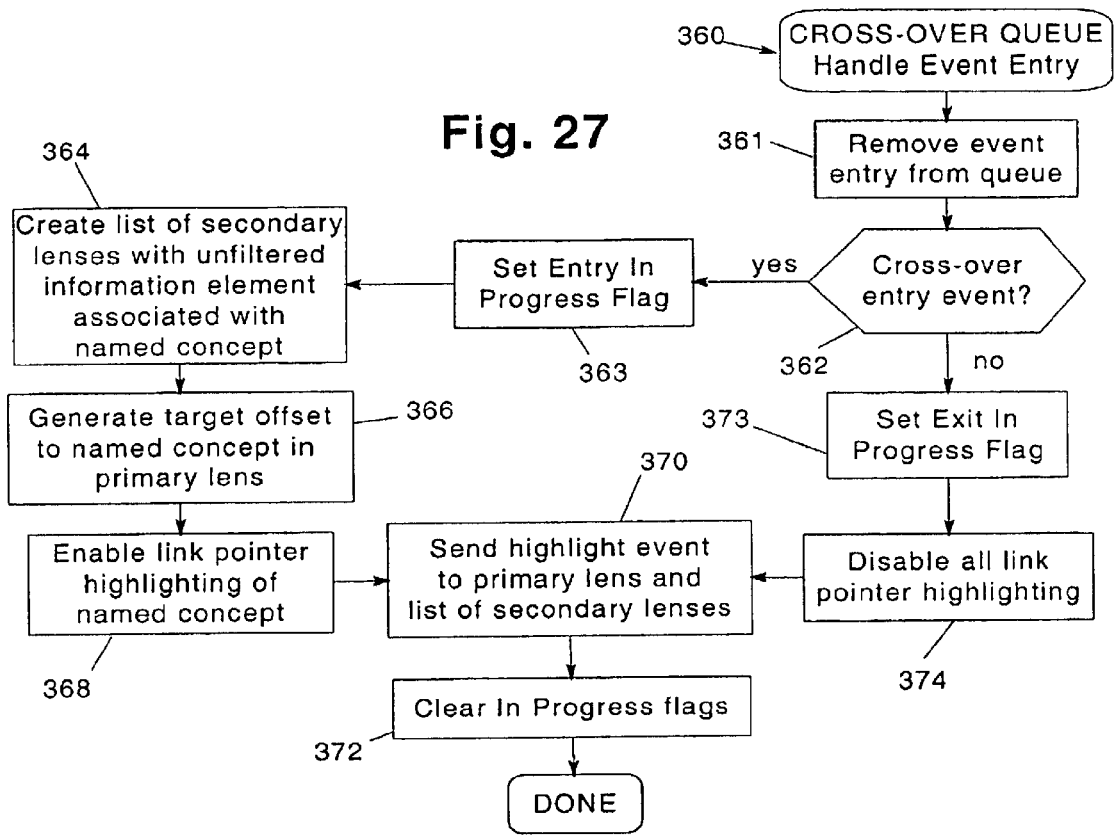
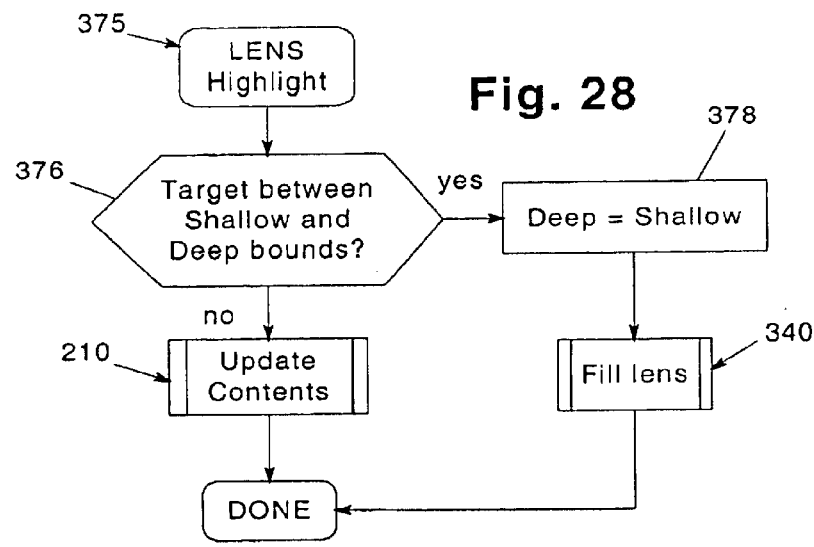

THREE-DIMENSIONAL MODEL TO FACILITATE USER COMPREHENSION AND MANAGEMENT OF INFORMATION

CROSS-REFERENCE TO RELATED APPLICATIONS

This application is related to the following co-pending applications which were filed on even date herewith by George Francis DeStefano: U.S. Ser. No. 09/020,534 entitled "COMPUTER SYSTEM, METHOD AND USER INTERFACE COMPONENTS FOR ABSTRACTING AND ACCESSING A BODY OF KNOWLEDGE" (RO997-004); U.S. Ser. No. 09/020,680 entitled "COMPUTER SYSTEM AND METHOD FOR CONTROLLING THE SAME UTILIZING A USER INTERFACE CONTROL INTEGRATED WITH MULTIPLE SETS OF INSTRUCTIONAL MATERIAL THEREFOR" (RO997-090); and U.S. Ser. No. 09/020,679 entitled "COMPUTER SYSTEM AND METHOD FOR ABSTRACTING AND ACCESSING A CHRONOLOGICALLY-ARRANGED COLLECTION OF INFORMATION" (RO997-092). This application is also related to the following co-pending applications which were filed on Dec. 15, 1997 by George Francis DeStefano: U.S. Ser. No. 08/990,370 entitled "COMPUTER SYSTEM AND METHOD OF MANIPULATING A WINDOW ON A COMPUTER DISPLAY THROUGH COLLISION WITH A POINTER" (RO997-005); U.S. Ser. No. 08/990,304 entitled "COMPUTER SYSTEM AND METHOD OF MANIPULATING MULTIPLE GRAPHICAL USER INTERFACE COMPONENTS ON A COMPUTER DISPLAY WITH A PROXIMITY POINTER" (RO997-041), now issued as U.S. Pat. No. 6,075,531). Each of these applications is hereby incorporated by reference herein.

FIELD OF THE INVENTION

The invention is generally related to computer systems and graphical user interface environments therefor. More particularly, the invention is related to display and user access to information in a computer system or the like.

BACKGROUND OF THE INVENTION

The human communication process has evolved over thousands of years to principally include both spoken and written communication. In addition, over time much of the combined knowledge base of the world has been recorded in written form (e.g., in books), so that others are able to more conveniently access and use such information.

With the advent of computer technology, more and more information is stored in an electronic form and accessed via a computer, rather than via the written page. Nonetheless, throughout the evolution of human communication, information has always be regarded as being essentially one-dimensional—that is, a series of ideas strung together in a sequence of words or pages. Book pages and computer displays are each two-dimensional in nature, and may even provide two dimensional representations of three-dimensional objects. However, the basic structure of a collection of information presented in either case is still for the most part one-dimensional insofar as a person processes the information in a generally linear fashion.

A one-dimensional representation of information may be adequate for some when the amount of information is not that great. However, a person may have difficulty fully comprehending a collection of information about a particular topic when the information is located in several sources and/or when the information is associated with several levels of abstraction.

A level of abstraction typically relates to a particular manner of looking at a given collection of information, also referred to as a body of knowledge. Among other criteria, different levels of abstraction may relate to different comprehension levels, e.g., a basic or summary level vs. an advanced level. Taking a subject such as snakes as an example, a discussion at an elementary school level might focus on how snakes lack legs or what snakes eat. At the level of a Ph.D. herpetologist, however, a discussion might instead focus on the evolutionary development of snakes or the biological mechanisms by which snakes sense prey.

A person may desire to access a collection of information in any number of circumstances, such as when exploring new disciplines or new approaches to familiar territory, or when returning to areas infrequently visited. When doing so, however, a person may be required to manage and understand a number of levels of abstraction at the same time. In the case of attempting to solve a particular problem, for example, a person may be required to manage and understand numerous levels of abstraction, e.g., broad and fundamental concepts, key terms and definitions, the details of the specific problem, the details of the solution to the specific problem, etc. However, both books and computers typically force a person to access the information from one source, and/or from one level of abstraction, at a time. The person is therefore required to plod through information in a linear fashion without the ability to visualize the relationship of the information in the broader scope of the body of knowledge.

Furthermore, in the instances where a person is able to access information from more than one source or level of abstraction, the information is often provided in disjointed views, offering no opportunity for a person to visualize the interaction of information from different levels and/or sources. When accessing books, a person may review different books related to a given topic, or may review different sections or chapters within the same book. Even though a person can open two books at the same time, the person still is required to shift his or her focus back and forth between the books, and between different pages in those books. As a result, the person is required to consciously recognize and maintain any associations in the information.

Moreover, while accessing information about a particular body of knowledge can be difficult and confusing for readers, oftentimes authors have just as much difficulty in deciding how to present information from a body of knowledge to potential readers. This is because a reader may be from any number of potential audiences. An audience in some instances may be made up of one or more individuals with a common level of understanding or experience, or it may be made up of differing individuals with differing views and abilities. Authors therefore often focus on a single audience, which has the undesirable effect of making the presentation less useful for other audiences. For example, a book may be too difficult for beginners to understand and too basic to even be useful to an expert. As a result, separate books at differing levels may eventually be authored for a given body of knowledge. Of course, this only makes it more difficult for a reader to access and comprehend the specific body of knowledge.

Many of the same difficulties associated with accessing and authoring information in book form are also associated with information in electronic form. Many computer systems, for example, use graphical user interfaces (GUIs) through which users are able to interact with the computer systems through intuitive operations such as "pointing and clicking" on graphical display elements. Information is often presented to a user in a GUI environment using a graphical user interface component known as a window. Each computer software application executing in a GUI environment is typically allocated one or more windows to present information to and/or receive input from a user. Moreover, a number of computer systems provide the ability to multitask—that is, to execute more than one computer software application at the same time—such that windows from multiple applications may be displayed on a computer display simultaneously.

While information from more than one source or level of abstraction for a body of knowledge may be displayed simultaneously in different windows on a computer system, the relationship between the information displayed in the different windows, as well as the relationship of the information within the broader scope of the body of knowledge, is often not readily discernable by a user. As a result, it can become difficult for a user to manage the information in a coherent manner. Switching between different formats and views can become disorienting and distracting, often significantly impeding the learning process.

In one specific technology area, online computer help systems, users may be presented with information about computer topics, e.g., relating to particular computer software applications. The presentation of these computer topics in many such systems often includes the presentation of multiple levels of abstraction of the computer topics. For example, a help system may display a help map or table of contents in one window at the same time that one or more help topics are displayed in other windows. However, the actual hierarchical relationship of any of these windows is typically not presented to the user, and consequently, a user may nonetheless become disoriented when switching back and forth between a map or table of contents, and one or more help topics. Particularly when more than one help topic is being displayed at a time, and when associated examples and/or tutorials are also presented, it can become difficult for a user to absorb and comprehend all of the various aspects of a particular computer topic.

Therefore, a significant need exists for an improved manner of representing a body of knowledge in a computer system to facilitate understanding of the body of knowledge by users. Specifically, a need exists for a manner of representing both information from a body of knowledge, as well as the contextual relationship of the information within the broader scope of the body of knowledge.

SUMMARY OF THE INVENTION

The invention addresses these and other problems associated with the prior art in providing in one aspect a computer system and method in which the presentation of information from a body of knowledge (BOK) to a user is three-dimensional in nature to facilitate user comprehension and management of both the specific information in the body of knowledge, as well as the contextual relationship of the information within the body of knowledge as a whole. Communication of information is therefore shifted from an essentially one-dimensional model to a three-dimensional model that is inherently more intuitive and efficient. As a result, the ability of a user to access, manage and comprehend a body of knowledge, or a specific problem related to that body of knowledge, is significantly enhanced.

Various embodiments of the invention utilize an abstraction stack that concurrently displays information elements associated with different levels of abstraction for a body of knowledge. Moreover, the abstraction stack visually links the information elements with one another in a three dimensional workspace to represent the hierarchical arrangement of the information elements within the scope of the overall body of knowledge. As a result, a user is more easily able to switch his or her focus between the various information elements without losing the context of particular information relative to other information in the body of knowledge.

Consistent with the invention, an abstraction stack may be displayed on a three-dimensional computer display, or more typically, an abstraction stack may be displayed in a three-dimensional representation on a two-dimensional computer display. Moreover, a number of methods of visually linking information elements from different levels of abstraction may be utilized. Among others, the information elements may be displayed at different points along an abstraction axis consistent with the relative levels of abstraction thereof. In addition, one or more connector display elements extending between the visual representations of different information elements may be used to visually link the information elements.

Consistent with another aspect of the invention, information may be displayed on a computer display concurrently in first and second windows. A hierarchical relationship between the windows may then be represented by orienting the first and second windows generally along an axis within a three dimensional workspace.

In addition to facilitating the access, comprehension, and management of a body of knowledge by a user, the invention further provides in another aspect a computer system and method of authoring a body of knowledge, where a user is permitted to input information with the contextual relationship of the information within the overall body of knowledge established in an intuitive and efficient manner. Specifically, various embodiments of the invention may utilize an authoring tool that facilitates the creation of a body of knowledge by an author by organizing information into one or more information elements associated with various levels of abstraction. Users may be concurrently presented with a plurality of user input elements configured to receive input from a user, with each user input element associated with a particular level of abstraction. Once information is received into a particular user input element, an information element is stored in a computer system and associated with the level of abstraction for the user input element. Therefore, as with accessing information, the creation of information may also be shifted from an essentially one-dimensional model to an inherently more intuitive and efficient three-dimensional model.

These and other advantages and features, which characterize the invention, are set forth in the claims annexed hereto and forming a further part hereof. However, for a better understanding of the invention, and of the advantages and objectives attained through its use, reference should be made to the Drawing, and to the accompanying descriptive matter, in which there is described exemplary embodiments of the invention.

BRIEF DESCRIPTION OF THE DRAWING

FIG. 6 is a flowchart illustrating the program flow of the initialize stack routine of FIG. 5.

FIG. 7 is a flowchart illustrating the program flow of the render stack routine of FIG. 6.

FIG. 27 is a flowchart illustrating the program flow of a handle event entry for a cross-over queue consistent with the invention.

FIG. 28 is a flowchart illustrating the program flow of a highlight event for the lens of FIG. 4.

DETAILED DESCRIPTION

The embodiments of the invention described hereinafter utilize an abstraction stack to represent information from a body of knowledge (BOK) stratified into a plurality of levels of abstraction. The abstraction stack concurrently displays multiple information elements associated with different levels of abstraction on a computer display, and visually links the information elements on the computer display in a three dimensional workspace to represent a hierarchical arrangement of the levels of abstraction.

A body of knowledge typically represents a collection of information related to a particular subject of interest. Practically any subject may be represented as a body of knowledge, including various educational topics, literary topics, reference topics, and computer topics, among others. A level of abstraction typically represents a particular manner of looking at a given body of knowledge, typically segregating information into different classifications or groupings that can be selectively filtered out to provide different presentations of information in the body of knowledge.

Information from a particular level of abstraction is typically presented in the form of an information element, which generally represents any segment of data that conveys information. While much of the focus herein will focus on alphanumeric or textual data, it should be appreciated that other types of data may be stored in an information element, including graphical data, audio data, video data, and executable data, among others. Moreover, an information element may include a link to other points in the same or a different body of knowledge, whereby a user may navigate within one or more bodies of knowledge by selecting information elements.

Prior to describing preferred embodiments of the invention, a brief discussion of exemplary hardware and software environments will be presented.

Hardware Environment

Figure 1:
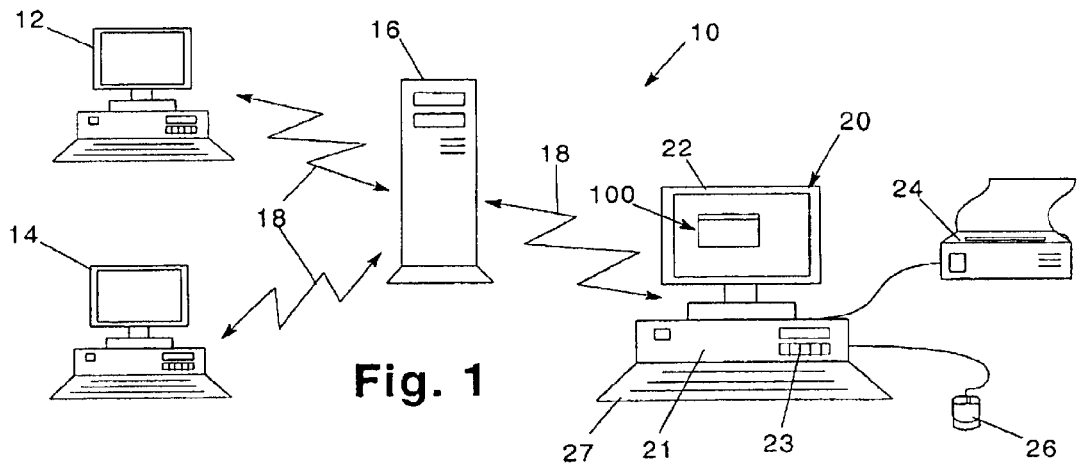
FIG. 1 is a block diagram of a computer system consistent with the invention.

Turning to the Drawing, wherein like numbers denote like parts throughout the several views, a computer system 10 consistent with the invention is illustrated in FIG. 1. Computer system 10 is illustrated as a networked computer system including one or more client computer systems 12, 14 and 20 (e.g., desktop or personal computers, workstations, etc.) coupled to server system 16 through a network 18. Network 18 may represent practically any type of networked interconnection, including but not limited to local-area, wide-area, wireless, and public networks (e.g., the Internet). Moreover, any number of computers and other devices may be networked through network 18, e.g., multiple servers. Furthermore, it should be appreciated that the principles of the invention may be utilized as well by stand-alone computers and associated devices consistent with the invention.

Computer system 20, which may be similar to computer systems 12, 14, may include a processor such as a microprocessor 21; a number of peripheral components such as a computer display 22; storage devices 23 such as hard, floppy, and/or CD-ROM disk drives; a printer 24; and various input devices (e.g., a mouse 26 and keyboard 27), among others. Computer system 20 operates under the control of an operating system, and executes various computer software applications, programs, objects, modules, etc. Moreover, various applications, programs, objects, modules, etc. may also execute on one or more processors in server 16 or other computer systems 12, 14, e.g., in a distributed computing environment.

Computer display 22 may include any known manner of visually presenting information to a user. For example, computer display 22 may be a video monitor, e.g., a cathode-ray tube (CRT), a liquid crystal display (LCD), or a projection display, among others. In addition, other types of computer displays, including two dimensional displays that simulate three dimensions (e.g., virtual reality headsets), as well as three dimensional displays such as holographic tanks and the like, may also be used.

User input may also be received from other known user input devices. For example, control of a pointer on a display may be handled by a trackball, a joystick, a light pen, a touch sensitive pad or display, a digitizing tablet, and a keyboard, among others. In addition, many of such devices include one or more user controls such as buttons, thumb wheels, sliders and the like. Moreover, voice and/or image recognition may be used to permit a user to provide voice commands and/or gestures to provide user input to a computer system. Other user interface devices may also be used in the alternative.

In general, the routines executed to implement the illustrated embodiments of the invention, whether implemented as part of an operating system or a specific application, program, object, module or sequence of instructions will be referred to herein as "computer programs". The computer programs typically comprise instructions which, when read and executed by one or more processors in the devices or systems in networked computer system 10, cause those devices or systems to perform the steps necessary to execute steps or elements embodying the various aspects of the invention. Moreover, while the invention has and hereinafter will be described in the context of fully functioning computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, DVD's, and transmission type media such as digital and analog communications links.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Software Environment

Figure 2:
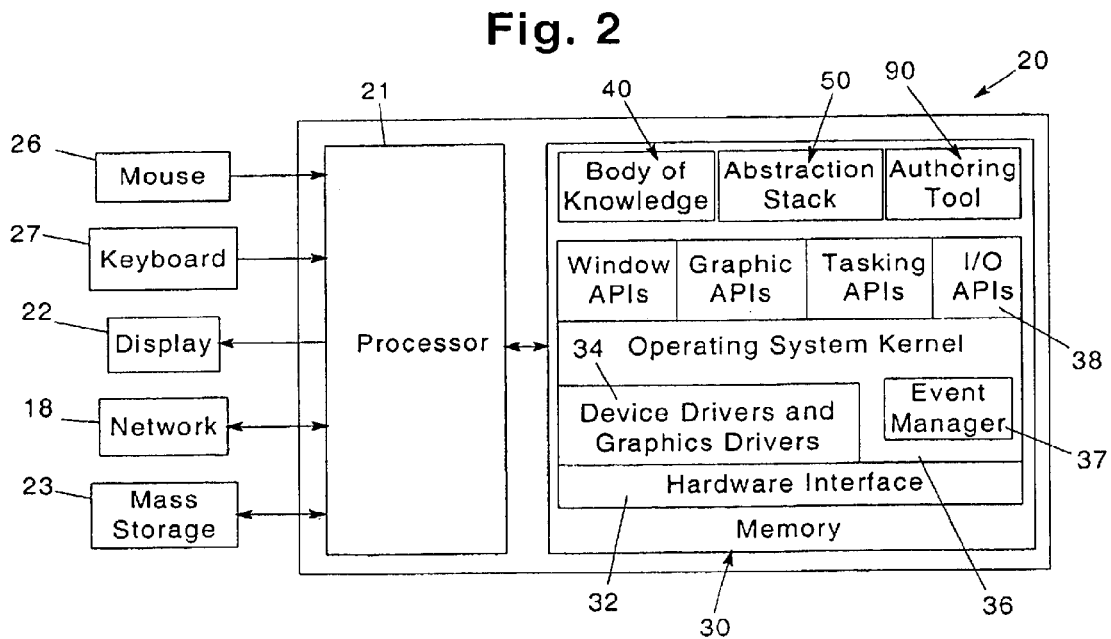
FIG. 2 is a block diagram of an exemplary software environment for the computer system of FIG. 1.

FIG. 2 illustrates one suitable software environment for computer system 20 consistent with the invention. A processor 21 is illustrated as coupled to a memory 30 as well as to several inputs and outputs. For example, user input is received by processor 21, e.g., by mouse 26 and keyboard 27, among others. Additional information may be passed between computer system 20 and other computer systems in networked computer system 10 via network 18. Additional information may be stored to and/or received from mass storage 23. Processor 21 also outputs display data to display 22. It should be appreciated that computer system 20 includes suitable interfaces between processor 21 and each of components 18, 22, 23, 26, 27 and 28 as is well known in the art.

A number of system computer programs are stored in memory 30, including hardware interface program code 32, device and graphics drivers 34, operating system kernel 36, and various application programming interfaces (APIs) 38, e.g., Window APIs, Graphic APIs, Tasking APIs and Input/Output APIs, among others. It should be appreciated that the configuration and operation of each of these system programs typically depends upon the particular computer hardware used, and is in general well understood in the art. For example, any of a number of operating systems may be used, e.g., OS/400 for the AS/400 midrange computer, Windows 95 or Windows NT for a PC system, MacOS for the Macintosh computer, or any of the number of variations of UNIX, among others.

Among the various functions of operating system 36 is that of event management, e.g., as handled by an event manager 37. Event manager 32 generally 15 provides in a dedicated execution thread an event-driven graphical user interface (GUI) environment for handling the display of information to, and the receipt of input from, a user.

Any number of computer software applications may execute on computer system 10 by utilizing the system program code provided therein. Moreover, memory 30 may also store data utilized by various applications or system program code. For example, FIG. 2 illustrates a body of knowledge 40, an abstraction stack 50, and an authoring tool 90, each of which are discussed in greater detail below.

It should be appreciated that the system program code represented at 32–38, body of knowledge 40, abstraction stack 50 and authoring tool 90 may be stored on network 18 or mass storage 23 prior to start-up. In addition, each may have various components that are resident at different times in any of memory 30, mass storage 23, network 18, or within registers and/or caches in processor 21 (e.g., during execution thereof).

It should also be appreciated that other software environments may be utilized in the alternative.

Information Abstraction

Information to be accessed by an abstraction stack typically must first be abstracted into the form of a body of knowledge. As discussed above, a body of knowledge typically represents a collection of information related to a particular subject of interest. Generally, a body of knowledge may be represented and maintained in a number of manners, including in a database, or in one or more documents, or files, within which the information is stored.

Figure 3:
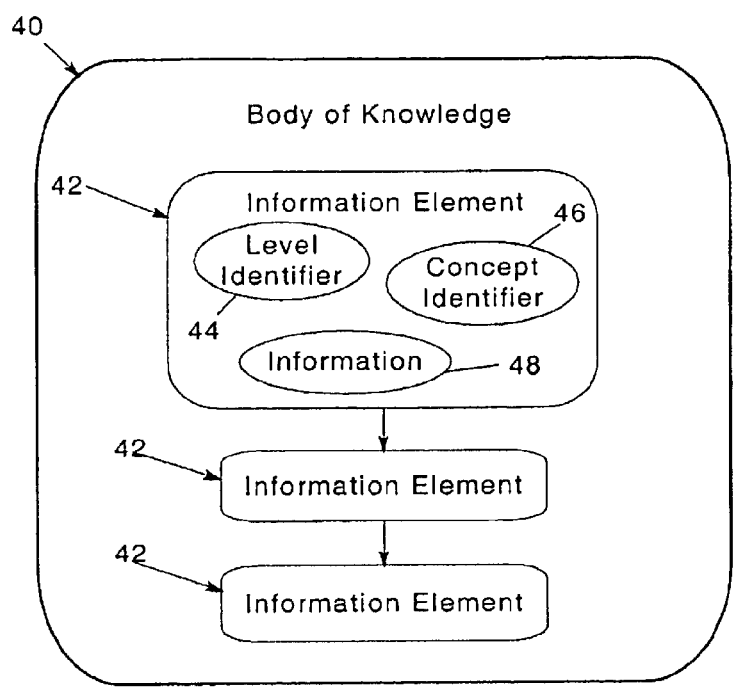
FIG. 3 is a block diagram of the software components in the body of knowledge of FIG. 2.

For example, FIG. 3 illustrates one manner of maintaining a body of knowledge 40 that utilizes an ordered list of information elements 42. As mentioned above, an information element typically represents a segment of data that conveys information related to one or more levels of abstraction in a body of knowledge. Each information element includes a level identifier 44, a concept element identifier 46 and information 48.

Level identifier 44 generally represents an author's designation of which if any levels of abstraction are related to the information in the information element, and thus, whether the information element is suitable for presentation in conjunction with the presentation of a particular level of abstraction. The level identifier can have a number of possible values, including a null value, a single level value, a list of level values, a range of level values, a list of ranges of level values, an upper level boundary, a lower level boundary, or any combination thereof. As discussed below with reference to the authoring process described in conjunction with FIGS. 36–41, a level identifier may include a level parameter, having one or more numerical or other sortable values representing a hierarchical relationship for the level, as well as a characterization or description that provides a more contextual and understandable identification of the level. Thus, while not being so limited, the level identifiers of abstraction stack 50 hereinafter will be described in terms of a characterization or description for ease of understanding.

A level of abstraction typically represents a particular manner of looking at a given body of knowledge. An abstraction stack may often be considered as addressing audiences with multiple levels of ability and interest. The audiences in some instances are made up of separate individuals. In other instances, a single individual's ability and interest can vary over time so that a single individual represents multiple audiences. As a result, the manner in which levels of abstraction are established for a body of knowledge can determine how different presentations can be tailored to specific audiences.

Consequently, the levels of abstraction assigned to a given body of knowledge may be based on numerous criteria. For example, levels of abstraction can be defined for different levels of comprehension (e.g., elementary, high school, undergraduate, Ph.D., novice, expert, etc.) Levels of abstraction may also be defined for different levels of detail (e.g., summary, overview, detailed, etc.) Levels of abstraction may also be defined for different communication tools or techniques for explaining a given topic (e.g., definitions, summaries, overviews, frequently asked questions (FAQ's), glossary terms, related topics, detailed explanations, formulas, illustrations, examples, tutorials, etc.) Levels of abstraction may also be broken up based upon different sections, or components, of a document (e.g., executive overview, preface, introduction, table of contents, headings, main body, footnote, summary, appendix, index, glossary, etc.) Levels of abstraction may also be distinguished based upon the type of data (e.g., text data, image data, audio data, video data, executable data, etc.) Levels of abstraction may also look at a body of knowledge from different perspectives, e.g., "what", "why", "how", "when", etc. For computer program code, different software components and/or layers may be defined, e.g., source code, object code, library, interface, framework, object or class definition, comment, etc. Other levels of abstraction may be defined to distinguish a work from comments thereon (such as analysis and critiques thereof), e.g., for literary interpretation of an author's collective works. Other manners of distinguishing levels of abstraction may also be used in the alternative.

Concept identifier 46 generally represents an author's identification of an information element in terms of one or more named concepts. The concept identifier may be used to associate the presentation of a concept at one level of abstraction with those of other levels, as information elements related to the same concept but from different levels will have the same concept identifier. The concept identifier can have any suitable value, e.g., a combination of alphanumeric characters, that provides a unique identification for a particular named concept. In addition, the concept identifier can be null to indicate a lack of association with a particular named concept.

Information 48 generally represents the actual data in the information element that is relevant to the body of knowledge. The information may be as small as a bit (e.g., a flag), or may include an unlimited amount and variety of data, including text data, image data, multimedia data such as audio and/or video data, executable data from an executable process, etc. Information 48 may also include other information elements, whereby nested information elements are supported.

Body of knowledge 40 may be created and/or maintained in a number of manners For example, a body of knowledge may be stored in one or more tag-delimited text documents, e.g., using a modified Hypertext Markup Language (HTML) format.

As an example, one suitable format of a body of knowledge document that will be used hereinafter to describe the various features of the invention is illustrated below in Table I:

TABLE I

Example Body of Knowledge Document

```
1  <html>
2  <head>
3  <title>Static Electricity</title>
4  </head>
5  <body>
6  <h1>Static Electricity Puts the Spark in Sparking</h1>
7  <p>Static electricity is a natural phenomenon familiar to many
   Minnesotans. We notice it during our cold dry winters when the
   sudden snap of an electrostatic discharge nips our noses as we kiss
   our spouses.
8  <infoel lvl=1>The discharge occurs just before our noses touch, when
   the distance between them is so small that the electricity leaps
   through the cold air like lightning to settle the difference in our
   noses' electrostatic potential. </infoel></p>
9  <p><infoel lvl=2 cid=coul>The force of the spark is determined by
   <B>Coulomb's law</B>which relates the charges on the noses
   and the distance between them to yield coulombs. </infoel>
10 <infoel lvl=3 cid=coul>Our understanding of<B>Coulomb's
   law</B>lets us quantify the electromagnetic force between two
   charges. The force is calculated as:
11 <pre>
12 F=kqu/rr
13 </pre>
14 where F is coulombs, k is the proportionality constant, q and u
   are the charges and r is the distance between the charges.
   </infoel></p>
15 <p><infoel lvl=2 cid=ohm>The air's resistance to the spark is
   determined by <B>Ohm's law</B>, which relates the length and
   thickness of the path it takes through the air to the air's
   suitability as an insulator to yield ohms </infoel>
16 <infoel lvl=3 cid=ohm><B>Ohm's law</B>gives us the resistance
   of a conductor between two charges. The resistance is calculated as:
17 <pre>
```

TABLE I-continued

Example Body of Knowledge Document

```
18 R=lp/A
19 </pre>
20 where R is ohms, l is length, p is resistivity and A is the
   cross-sectional area of the conductor. </infoel></p>
21 <p><infoel lvl=2 cid=rstv>The spark's path tends to be short and
   thick or long and thin. Warm moist air is a better insulator, i.e., has
   higher resistivity, than cold dry air.</infoel>
22 <infoel lvl=3 cid=rstv>The cross-sectional area of the column of air
   between the noses varies inversely with the distance between the
   noses. The resistivity of the air itself varies with the temperature
   and relative humidity. The resistivity of air at different temperature
   and humidity combinations is shown in the following table. </p>
23 <table>
24 [EMBEDDED TABLE]
25 </table></infoel>
26 <p>Move the Minnesotans together and apart to see
   the sparks fly when they kiss, </p>
27 <script language="JavaScript">
28 [EMBEDDED SCRIPT #1]
29 </script>
30 <infoel lvl=3><p>Vary the temperature and relative humidity of
   the Minnesotan's environment to see how this affects the resistivity
   of the air between them and the distance at which the coulombs
   overcome the ohms. </p>
31 <script language="JavaScript">
32 [EMBEDDED SCRIPT #2]
33 </script></infoel>
34 </body>
35 </html>
```

The example document utilizes standard HTML-format tags to format the information in the document. Furthermore, an additional tag "<infoel>" is utilized to delimit the information in the document into a plurality of information elements. The tag includes a "lvl" field that functions as the level identifier, and a "cid" field that functions as the concept identifier. The text data between the "<infoel>" and "</infoel>" tags functions as the information for an information element.

It should also be noted from the above example document that a portion of the information in a document may not be delimited by "<infoel>" tags. In such instances, it is often desirable to format such information into default information elements having null value level and concept identifiers, so that all information in the document is associated with an information element.

It should further be appreciated that, for performance concerns, it may be desirable to load the information stored in a text body of knowledge document into a specific data structure for access to and manipulation of the information by an abstraction stack. As such, it may be desirable to pass the document through a parser to generate a suitable data structure. The use and configuration of parsers (e.g., HTML parsers) is well known in the art, and thus, it would be well within the capabilities of one of ordinary skill in the art to parse a text body of knowledge document into an alternate data structure. Moreover, as will be discussed in greater detail below, new or existing information may be entered directly into a body of knowledge in the format described herein during creation of the body of knowledge.

A body of knowledge may be represented in any number of alternate manners. For example, more than one file or document may be used to represent a body of knowledge. Similar to HTML documents, a body of knowledge document may also cross-reference other documents such that one document serves as a container for the information in another document. A body of knowledge may also be stored in a database, with each information element allocated a record therein. Other variations will be apparent to one of ordinary skill in the art.

As discussed above, a body of knowledge may represent a collection of information related to innumerable types of subjects, including various educational topics, literary topics, technical topics, reference topics, and computer topics, among others. For example, several specific examples of suitable applications are disclosed in greater detail in the aforementioned incorporated applications entitled "COMPUTER SYSTEM AND METHOD FOR CONTROLLING THE SAME UTILIZING A USER INTERFACE CONTROL INTEGRATED WITH MULTIPLE SETS OF INSTRUCTIONAL MATERIAL THEREFOR" and "COMPUTER SYSTEM AND METHOD FOR ABSTRACTING AND ACCESSING A CHRONOLOGICALLY-ARRANGED COLLECTION OF INFORMATION".

Various additional classes of suitable applications of the invention include instructional, technical, reference, educational and literary applications where it is desirable to organize information with a hierarchical and easily accessed manner of presentation, e.g., novels, screen plays, literary interpretations, procedural manuals, operator manuals, cookbooks, encyclopedias, dictionaries, textbooks, system interfaces, and application interfaces, among others. Another class of suitable applications of the invention is that of computer software applications in which information can be stratified into different strata or levels of abstraction, e.g., help systems, project managers, personal information managers and organizers, database tools, mail/news readers, groupware, taxonomy viewers/editors, web document builders, web site builders, organization charting applications, outliners, and word processing and authoring systems (e.g., for software, legal topics, legal opinions, disclosures, etc.), among others. For example, in a mail/news reader application, one level of abstraction may be a list of news groups or mail folders, with another level of abstraction set to lists of messages in specific news groups or folders, and with a third level of abstraction set to the text of specific messages in the lists of messages.

Another class of suitable applications is based upon presenting different points of view for a body of knowledge. For example, a legal trial preparation tool may utilize abstraction levels defined to provide different witness, victim and/or perpetrator accounts of a event or crime. As another example, a unique style of fictional work may be authored and presented to a reader such that a story or certain events could be presented concurrently to a reader through the eyes of different characters in the story.

Other applications not specifically mentioned herein will be apparent to one of ordinary skill in the art.

Abstraction Stack Organization

As discussed above, an abstraction stack is utilized to access and/or manipulate the information stored in a body of knowledge, e.g., body of knowledge 40. One suitable implementation of an abstraction stack is illustrated at 50 in FIG. 4. The abstraction stack includes two primary components, a depth manager 60 and a flow manager 80. Depth manager 60 generally maintains the data structure of the abstraction stack and handles rendering of the abstraction stack on a computer display. Flow manager 80, on the other hand, generally handles the user interaction with the data structure to modify the manner in which the data structure is displayed by the depth manager.

An abstraction stack generally provides a visual manner of organizing multiple levels of abstraction. Each level of abstraction in a body of knowledge is typically represented in an abstraction stack by a focal plane organized along a common depth vector, or abstraction axis, extending generally perpendicular thereto. The focal planes are organized along the depth vector based upon the manner of categorizing the levels of abstraction. For example, if levels of abstraction relate to different levels of detail, the focal planes may be organized sequentially based upon the relative levels of detail for their associated levels of abstraction.

An abstraction stack functions to display information from one or more focal planes in such a manner that the different focal planes are organized in a three-dimensional workspace such that the relative arrangement of the focal planes is readily apparent therefrom. Focal planes are generally handled as two-dimensional virtual constructs, with the depth vector upon which focal planes are organized representing the third dimension of the stack. As a result, display of an abstraction stack on a two-dimensional display such as a video monitor often requires three-dimensional modeling techniques to be utilized to provide a three-dimensional rendering of an abstraction stack.

Figure 4:
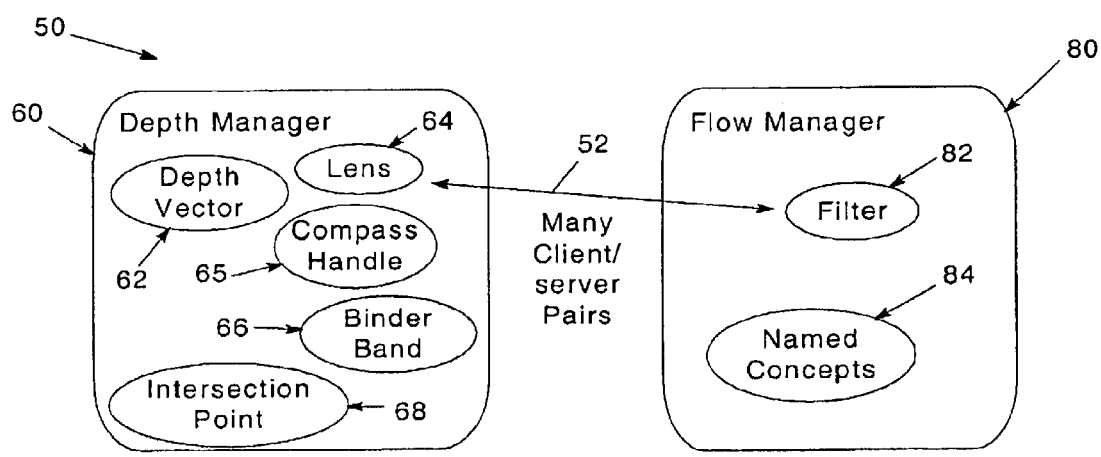
FIG. 4 is a block diagram of the software components in the abstraction stack of FIG. 2.

Depth manager 60 generally handles the data structure of the abstraction stack as well as rendering of the abstraction stack on a computer display. The data structure of the abstraction stack includes a plurality of objects representing different abstraction stack components. As shown in FIG. 4, a depth vector 62 is provided for the data structure to organize each focal plane, or level of abstraction, for a body of knowledge. Depth vector 62 is principally an organizational construct, and may or may not be displayed on a computer display. Focal planes are organized at predetermined positions along the depth vector, e.g., evenly spaced along the length thereof.

Another type of object forming the data structure of the abstraction stack is a lens 64, which typically serves as a point of attachment and focus point along the abstraction stack for stack manipulation and content. The lens object 64 includes a number of subclassed lens types. A suspended lens, for example, is used to display the information from one or more levels of abstraction. In addition, a suspended lens is typically represented in much the same manner as a GUI window, with controls such as resizing handles, minimizing handles, scroll bars, etc. used to modify the appearance and content displayed in the lens. As discussed below, various filtering and linking techniques may be utilized on a suspended lens to modify the information displayed therein. Moreover, suspended lenses may be further subclassed into primary and secondary lenses, as well as supplementary lenses, all of which are discussed in greater detail below.

An additional subclass of the lens object is a minor lens, which generally provides a minimized representation of a suspended lens. Typically, a minor lens is arbitrarily small so that its minimized representation is apparent to a user. Another subclass of lens is a prime lens (discussed below), which is essentially a maximized view of a suspended lens. A collapsed abstraction stack is typically displayed concurrently with a prime lens to maintain a visual relationship of the prime lens within the abstraction stack as a whole.

Another abstraction stack object data structure is a compass handle 65, which is typically located at an end of a depth vector of an abstraction stack. A compass handle typically functions as an endpoint of the abstraction stack, and may function as a focal point for manipulation of and access to a minimized or maximized abstraction stack (discussed below). In addition, a compass handle may be used as a point of attachment to other related abstraction stacks for a particular body of knowledge.

Another object in the abstraction stack data structure is a binder band 66, which provides one manner of visually representing the hierarchical arrangement of levels of abstraction via visually connecting other objects displayed along a depth vector of an abstraction stack. One subclass of a binder band is a shaft band, which generally links together objects associated with different levels of abstraction in a body of knowledge. Another subclass of a binder band is a strata band, which generally links together objects associated with the same level of abstraction in a body of knowledge. A binder band is typically represented by one or more connecting elements that extend between two other displayed objects. For example, in one embodiment, a binder band may be represented by four lines extending between corresponding corners of two objects. Other numbers of lines, as well as other forms of connecting elements, may be used to represent a binder band in the alternative.

One additional abstraction stack object is an intersection point 68, which principally functions to identify a single focal plane along the length of a depth vector when no lens is displayed at that location along the depth vector. The intersection point typically may be manipulated by a user to create a lens associated with the focal plane for the intersection point.

As discussed above, flow manager 80 generally handles the user interface with the abstraction stack data structure to modify how the abstraction stack is displayed by the depth manager, including handling information flow to the various lenses displayed for the abstraction stack. Flow manager 80 is coupled to depth manager 60 through a number of client/server pairs shown at 52. The client/server pairs 52 couple together lenses with filters and generally function to control the flow of information from the body of knowledge into a lens.

Flow manager 80 includes a number of objects that are utilized to handle user interaction with the abstraction stack. For example, flow manager 80 utilizes one or more filter objects 82 to define the manner in which information is displayed in suspended lenses. Each filter object 82 defines a predetermined filtering criteria used by a lens. A user is permitted to access and manipulate the filtering criteria to modify the manner in which information is displayed by the abstraction stack.

A list of available named concepts 84 is also maintained by flow manager 80 to determine when to visually link together information that is related to a particular concept when information from different levels of abstraction is concurrently displayed. As will be discussed in greater detail below, the named concept information is utilized by the flow manager, for example, when the user interface is in a link pointer mode. In addition, some filter implementations may also rely on the named concept information when filtering information from one or more suspended lenses.

User interaction with the abstraction stack is principally handled by a pointer (not shown in FIG. 4) that is manipulated by one or more user interface devices such as a mouse, a trackball, a keyboard, a touch pad, etc. A pointer may be placed into one of several modes, and may also be used in such operations as switching focus between lenses, highlighting information for cut and paste operations, etc. Other uses of the pointer include various conventional pointer-based actions, such as resizing, moving, closing and similar window operations, selection of menu entries, and selection of buttons, among others.

While the above-described organization of the abstraction stack is object oriented, it should be appreciated that other programming methodologies, e.g., procedural, may be used in the alternative. It should also be appreciated that the various functions described herein for the abstraction stack and its components may be allocated to different software routines and/or structures consistent with the invention.

Abstraction Stack Operation

The operation and usage of an abstraction stack consistent with the invention is now described. As discussed above, an event-driven system may be utilized herein to handle user interaction with an abstraction stack. As such, a main routine for event manager 37 of operating system 36 (FIG. 2) is illustrated at 100 in FIG. 5. It should be appreciated that non-event-driven implementations may be utilized in the alternative.

Routine 100 may be considered to operate in an endless loop—typically as a dedicated process running in the background of operating system 36. As is well-known in the art, routine 100 waits for events at block 102 and passes such events to appropriate handling routines. Several such events consistent with the invention are detected at blocks 106–114. Also shown in FIG. 5 is a block 104 that handles the multitude of other types of events generated in the computer system, but which are not relevant to an understanding of the invention.

Stack Initialization

Figure 5:
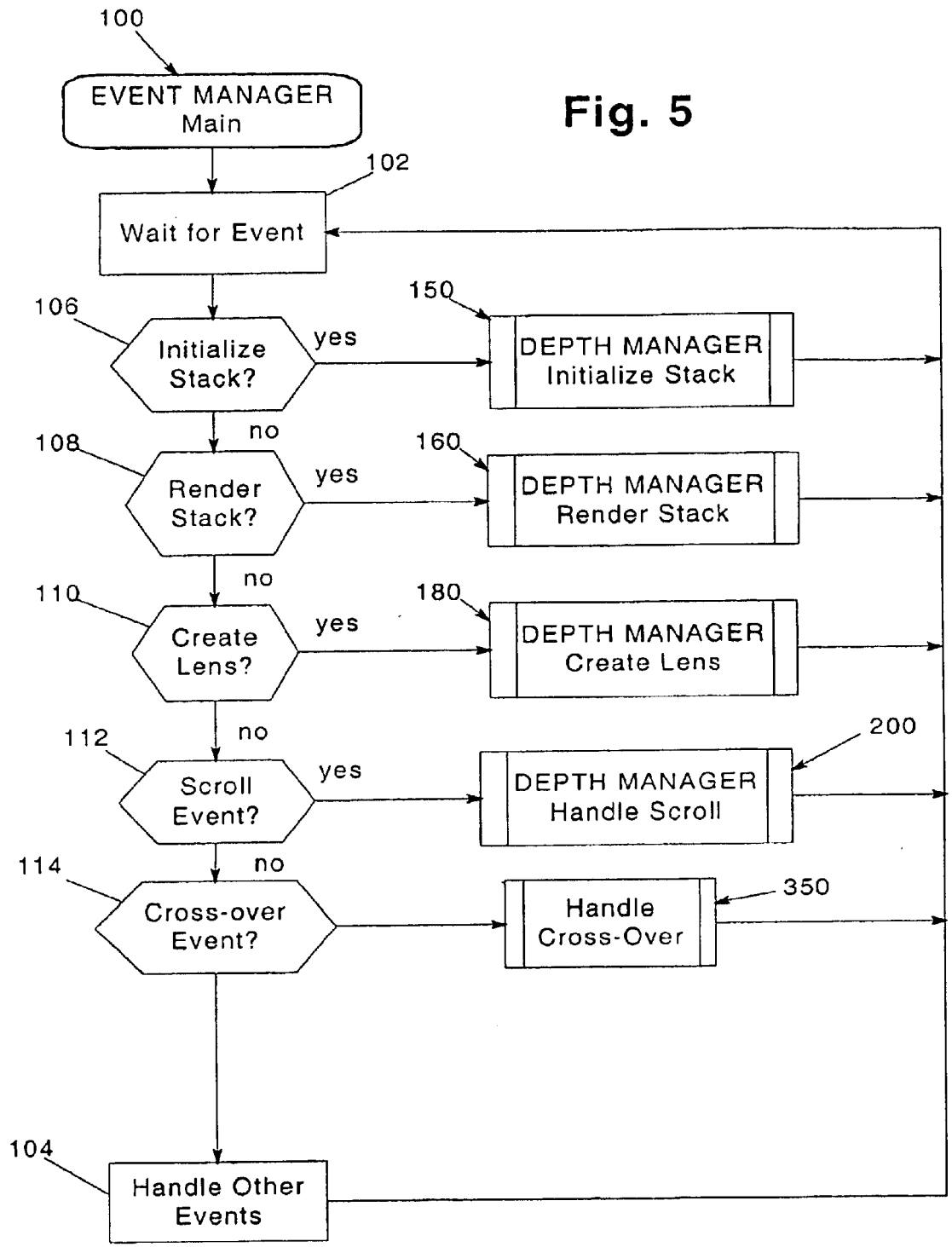
FIG. 5 is a flowchart illustrating the program flow of a main routine for the event manager of FIG. 2.

As shown in FIG. 5, an initialize stack event is detected in block 106 and handled by an initialize stack routine 150 executed by depth manager 60, which is shown in greater detail in FIG. 6. Routine 150 begins at block 151 by retrieving a body of knowledge document and parsing the document into the data structure illustrated generally in FIG. 4. As discussed above, parsing of a text document into a more efficient data structure is well known in the art. Upon completion of the parsing operation, a body of knowledge data structure including eleven information elements is created, with each element including the data set forth in Table II below (with any embedded formatting information not shown in the table):

TABLE II

Example Body of Knowledge Data Structure

| Info. Element | Level ID | Concept ID | Information |
|---|---|---|---|
| A | null | null | "Static Electricity Puts the Spark in Sparking" |
| B | null | null | "Static electricity is a natural . . . as we kiss our spouses." |
| C | 1 | null | "The discharge occurs . . . noses' electrostatic potential." |
| D | 2 | coul | "The force of the spark . . . them to yield coulombs." |
| E | 3 | coul | "Our understanding . . . distance between the charges." |
| F | 2 | ohm | "The air's resistance . . . as an insulator to yield ohms." |
| G | 3 | ohm | "Ohm's law gives . . . area of the conductor." |
| H | 2 | rstv | "The spark's path tends . . . resistivity, than cold dry air." |
| I | 3 | rstv | "The cross-sectional . . . [EMBEDDED TABLE]" |
| J | null | null | "Move the Minnesotans . . . [EMBEDDED SCRIPT #1]" |
| K | 3 | null | "Vary the temperature . . . [EMBEDDED SCRIPT #2]" |

Next in block 152, a depth vector object is created, or instanced, to generate a depth range along which objects to be displayed are located along an abstraction axis. A depth vector object may include, for example, a linked list of objects defined along the depth vector. Alternate data structures may be used in the alternative.

A pair of compass handle objects are next created and linked to each end of the depth vector in block 154, e.g., by setting depth values therefor to the minimum and maximum depth values for the depth vector. Next, the body of knowledge data structure is scanned in block 156 to determine what levels of abstraction are defined therefor. From this information an intersection point object is created for each level of abstraction and linked to the depth vector. Typically the intersection points are evenly spaced along the depth vector. Consequently, for the body of knowledge of Table II, three levels of abstraction would be found, and three intersection points would be linked to the depth vector at even spacing thereon, thereby partitioning the depth vector into four equal-length segments. This may be performed, for example, by setting depth values for the intersection points to 25%, 50% and 75% of the length of the depth vector.

Next, in block 158, shaft band objects are created extending between each of the compass handles and intersection points. Each shaft band object may include, for example, pairs of end points for four line segments to extend between corners of adjacent display elements. Next, in block 159, a render stack event is generated for the depth manager to initiate rendering of the abstraction stack on the computer display. Routine 150 is then complete.

Returning to FIG. 5, a render stack event is detected in block 108 and handled by a render stack routine 160. Routine 160 as discussed hereinafter renders an abstraction stack as a three-dimensional representation on a two-dimensional computer display such as a video monitor, or on a simulated three-dimensional display such as a virtual reality headset. Routine 160 utilizes a viewpoint parameter, which is a location in a three-dimensional space from which to view the abstraction stack (typically relative to the orientation of the depth vector). For example, one suitable viewpoint may render the depth vector as extending from a starting position in the lower left of the display to an ending position in the upper right of the display, among others.

It should be appreciated that the viewpoint may be fixed, or may be customizable by a user, e.g., through an options or preferences selection. In addition, a viewpoint may be dynamically varied by a user, similar to the manner in which a user is able to "walk" around a virtual world in Virtual Reality Modeling Language (VRML) browsers. It should also be appreciated that routine 160 may instead render an abstraction stack in a three dimensional display such as a holographic tank or the like in the alternative.

Routine 160 may also utilize a zoom factor that determines the scale used to render the abstraction stack. The zoom factor may be fixed, or may be customizable by a user. The zoom factor may also be dynamically variable so that a user can zoom in and out on-the-fly. In addition, the zoom factor may be calculated after objects are placed in the abstraction stack so that a maximized view of the entire stack is rendered in the computer display.

As illustrated in greater detail in FIG. 7, routine 160 begins in block 162 by calculating the viewpoint and/or zoom factor for the depth vector, e.g., by retrieving currently-stored parameters therefor. Next, in block 164, a loop is initiated to process each object in the abstraction stack (e.g., lenses, intersection points, etc.), with the exception of the binder bands. While additional objects remain to be rendered, block 165 is executed to render the next object along the depth vector at its proper orientation thereon, using conventional three-dimensional modeling techniques well known in the art. Moreover, for lenses and the like which display information from the body of knowledge, the appropriate information is rendered in a manner suitable for the particular format of the information elements in the body of knowledge. For example, for a body of knowledge that is in an HTML format, rendering the displayed contents of a lens may require HTML parsing and rendering operations similar to those performed by conventional HTML-compatible browser applications.

Next, block 166 determines whether any additional objects exist at the same depth. For each such object, block 167 renders these additional objects at appropriate orientations offset from the depth vector but at the same relative depth thereon. Typically such objects are supplementary lenses (as discussed in greater detail below).

Once each object has been rendered, block 168 is executed to render the binder bands between each displayed object, typically by rendering four line segments extending between the four corners of each adjacent pair of objects. For adjacent objects along the depth vector, the binder bands are referred to as shaft bands, and for adjacent objects that are oriented at the same depth on the depth vector, the binder bands are referred to as strata bands. The display is next refreshed in block 168 such that the rendered abstraction stack is displayed on the computer display. Routine 160 is then complete.

Figure 8:
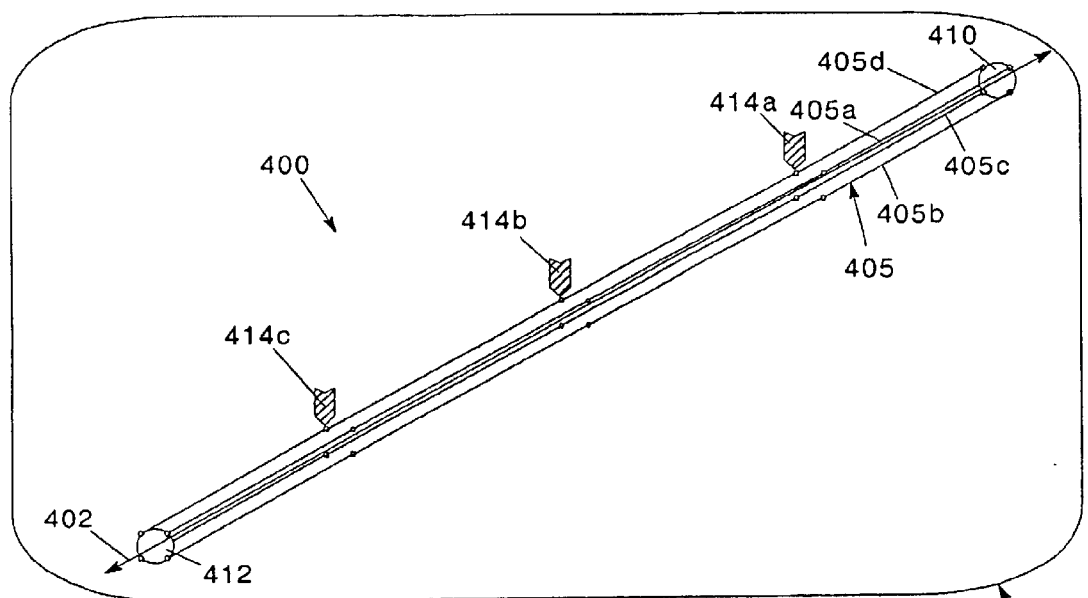
FIG. 8 is a block diagram illustrating a computer display within which is displayed an abstraction stack after execution of the initialize stack routine of FIG. 5.

As an example of the operation of routines 150 and 160, FIG. 8 illustrates a three-dimensional rendering of an initialized abstraction stack 400 on computer display 22. First, a pair of compass handles 410, 412 are created at opposite ends of a depth vector 402. Also, using the aforementioned example BOK document, three levels of abstraction are provided, and thus, three intersection points 414a, 414b, and 414c are evenly disposed along the length of depth vector 402. Binder bands are then rendered to connect each object 410, 412, 414a, 414b, and 414c. For example, a binder band 405, including line segments 405a, 405b, 405c and 405d, is illustrated connecting compass handle 410 to intersection point 414a.

Lens Creation

Lenses are much like windows in common GUI environments, insofar as they provide a window into a portion of the information in a body of knowledge. Lenses differ from windows, however, in that multiple lenses may be related to one another through predetermined relationships.

For example, lenses may be related through a coordinated scrolling relationship, whereby multiple lenses may be coordinated to display different views of essentially the same concepts in a body of knowledge, with coordinated scrolling provided to ensure that the lenses track one another as lenses are scrolled to display other concepts in a body of knowledge. To this extent, lenses in an abstraction stack are typically grouped into one or more lens sets. Each lens set typically has associated therewith a current location or position in the body of knowledge that is consistent across each lens in the lens set. Each lens, however, may also have start and end boundaries, referred to herein as shallow and deep bounds, that define at the extent of a "window" or segment of information from the body of knowledge that is displayed in a particular lens. By maintaining the current position for the lens set between the shallow and deep bounds of each lens in the lens set, the lenses are permitted to track one another during scrolling operations.

Lenses in a coordinated scrolling lens set are typically, but not necessarily, disposed along the depth vector and connected by shaft bands. Lenses that are disposed along a depth vector may be considered as depth vector lenses, and are typically either primary or secondary lenses. Primary and secondary lenses are associated in a common lens set, with the only difference therebetween being that a primary lens is the focus of a user's interaction with the abstraction stack in navigation of the body of knowledge, while a secondary lens is typically modified automatically in response to user operations on the primary lens. A secondary lens typically displays the same concepts as a primary lens, albeit with an independent filter configuration that provides an alternate view of essentially the same information in the body of knowledge. In addition, a secondary lens may be activated to become the primary lens, whereby the prior primary lens then becomes a secondary lens.

Lenses may also be related through an inherited filter relationship, whereby one lens, designated a supplementary lens, inherits the filter characteristics of another lens, designated a supplemented lens. A supplementary lens provides a view of information at an alternate point within the body of knowledge to that of the lens supplemented thereby. Navigation with a supplementary lens is independent of its supplemented lens, although the filter configuration is typically identical to that of its supplemented lens.

Supplementary lenses are typically disposed at the same depth along the depth vector as their associated supplemented lens, but spaced apart from the supplemented lens within the same plane. Supplementary lenses may also be members of a lens set of other supplementary lenses such that a coordinated scrolling relationship is provided therebetween.

Therefore, it may be seen that any given lens may be distinguished as being a primary or secondary lens, depending upon whether the lens is the focus of user input, as well as being a supplemented (depth vector) lens or being a supplementary (offset from depth vector) lens.

Each lens also has associated therewith a filter that defines how the lens displays information from the body of knowledge. Specifically, a filter for a lens typically defines whether a lens passes or blocks information elements from each level of abstraction. In addition, for each level of abstraction passed by the filter, the filter defines how the information elements therefrom are transformed, if at all, when displayed in the lens.

The types of filters that may be useful in an abstraction stack typically varies depending upon the manner in which a body of knowledge is stratified into levels of abstraction, which may be referred to as an abstraction scheme. A body of knowledge may be represented by one abstraction scheme or by multiple abstraction schemes, with one or more of such schemes specifically defined by an author or developer, and/or with one or more of such schemes inherently defined, e.g., based upon standard document components or data types.

For example, for abstraction levels defined in terms of levels of comprehension, filters may be established to provide beginner, intermediate and expert-level presentations of the body of knowledge, among others. For abstraction levels defined in terms of levels of detail, filters may be established to provide an overview, outline, or detailed explanation of a body of knowledge, among others. For abstraction levels defined in terms of levels of data types, filters may be established to provide separate views of text, illustrations, video clips, etc. in the body of knowledge. For abstraction levels defined in terms of document components, filters may be established to present the body of knowledge as a table of contents, a body, a glossary, an index, etc. For abstraction levels defined in terms of communications techniques, filters may be established to present a body of knowledge as a list of examples, answers to questions, tutorials, etc. For abstraction levels defined in terms of computer software components and/or layers, filters may be established to provide views of a computer program such as for source code, object code, comments, source code with comments, API's, class definitions, etc. Also, for abstraction levels that distinguish between a body of work and comments, critiques, and analysis thereof, different filters may be defined to present views of the work, the comments, the comments integrated into specific sections of the work, etc. Abstraction levels may also be stratified based upon point of view, immediacy and/or personal relevance. Other filter configurations suitable for presenting different views of different bodies of knowledge should be apparent to one of ordinary skill in the art.

Returning to FIG. 5, another event handled by the event manager is that of a request to create a new lens on the abstraction stack, which is detected at block 110 and handled by a create lens routine 180. The event may be initiated in response to a number of user input actions, including via a pull-down or pop-up menu, a toolbar button, a keystroke combination, or selection of a user interface control in the abstraction stack. For example, for a depth vector lens, a lens may be created in response to user selection of one or more intersection points in the stack (whether contiguous or non-contiguous), with the selected intersection point or points defining which levels of abstraction will be initially displayed in the lens. For a supplementary lens, a lens may be created in response to user selection of a lens to be supplemented (e.g., through double-clicking on the title bar).

Figure 9:
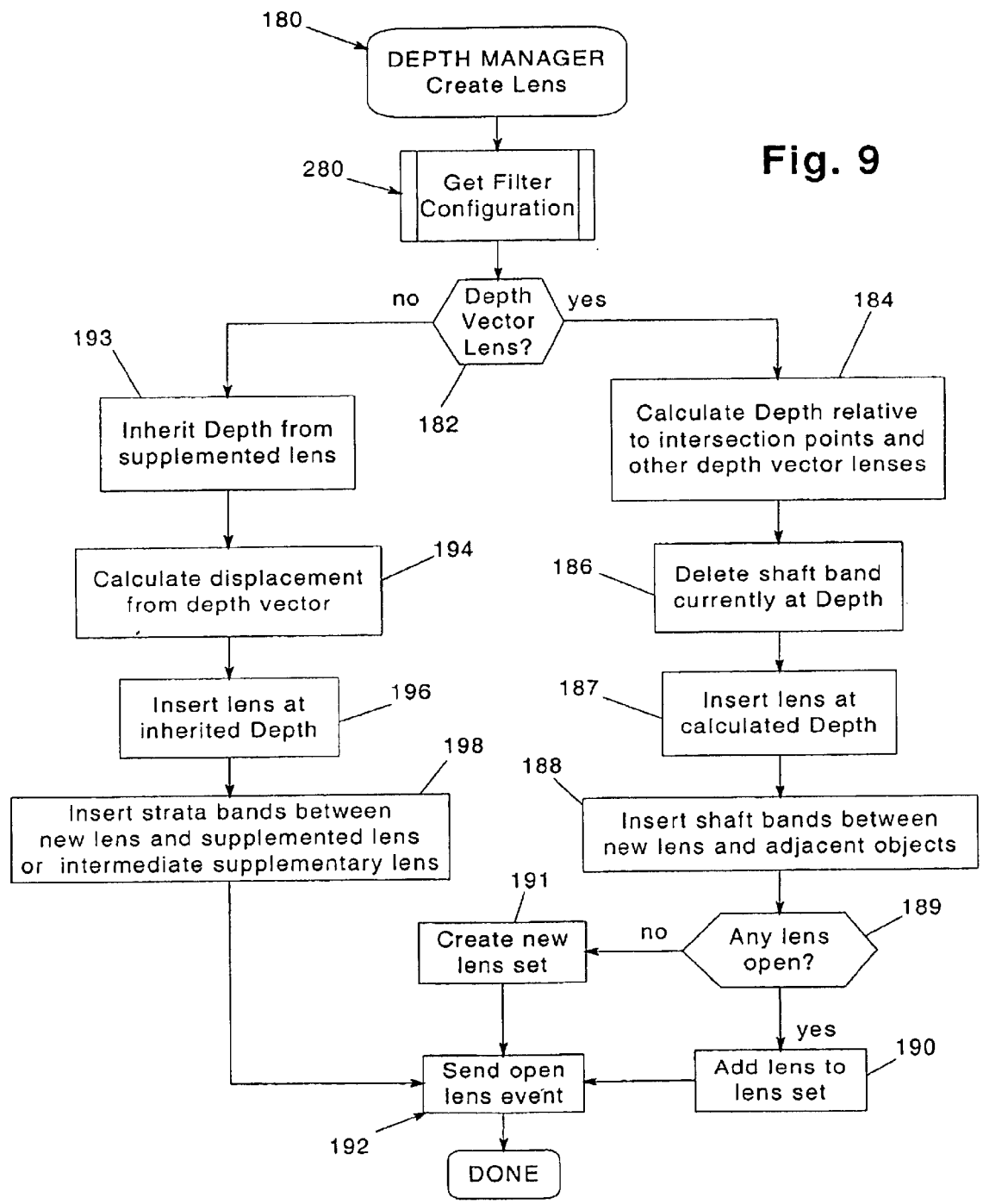
FIG. 9 is a flowchart illustrating the program flow of the create lens routine of FIG. 5.

Routine 180 is illustrated in greater detail in FIG. 9, and begins by calling a get filter configuration routine 280 to determine the initial filter configuration for the lens. Once the filter configuration is obtained, block 182 is executed to determine whether the lens is a depth vector lens. If so, control is passed to block 184 to calculate a depth value, i.e., the relative position of the lens along the depth vector, for the lens relative to the intersection points and other depth vector lenses. If only one level of abstraction is displayed in the lens, the depth is typically at the intersection point for the focal plane for that layer of abstraction. If multiple levels of abstraction are displayed in the lens, the depth may be determined, for example, based upon the greatest number of included contiguous intersection points in the filter configuration, e.g., at the midpoint of the contiguous intersection points. If there is no greatest number, the placement of the lens may coincide with the position of the intersection point with the fewest non-selected intersection points between it and the nearest compass handle. Also, if there is no such intersection point, the lens may be placed arbitrarily and unpredictably on one side of the midpoint of the abstraction stack. Other manners of placing a lens along the depth vector will be apparent to one of ordinary skill in the art.

Next, block 186 deletes the shaft band (or other) object at the current depth of the lens, and then, block 187 inserts a new lens at the calculated depth. The new lens may be inserted, for example, into a linked list representing the abstraction stack, in a manner known in the art.

Next, block 188 inserts new shaft bands between the new lens and the adjacent objects along the depth vector (e.g., by inserting such objects into an abstraction stack linked list. It should be appreciated that the functions of blocks 186–188 may be performed, for example, in an object oriented system as part of a constructor routine for a lens object that is supplied with the depth value for the lens as calculated above.

Next, block 189 is executed to determine if any other lens in the current lens set is open (if multiple lens sets are permitted) in the abstraction stack. If so, block 190 is executed to add the new lens to the lens set. If not, block 191 is executed to create a new lens set with the new lens as its sole member.

Both blocks 190 and 191 then pass control to block 192 to issue an open lens event to the new lens in block 192 to open the lens to a non-minimized state in the abstraction stack. Routine 180 is then complete. In the alternative, creation and opening of a lens may be considered two independent actions requiring specific input from a user, whereby an open lens event would be initiated in response to specific user input. A lens may also be initially displayed as a minor (minimized) lens if desired.

Returning to block 182, if the new lens is not a depth vector lens, but is instead a supplementary lens, control is passed to block 193 to set the depth value for the new lens to that of the lens that will be supplemented by the new lens. Next, block 194 calculates the displacement of the new lens from the depth vector in the plane of the supplemented lens. The displacement may have a distance value, as well as a directional value, to orient the supplementary lens relative to the supplemented lens. To this extent, a supplementary lens may be distinguishable from a depth vector lens by analyzing the displacement value for a lens, whereby a depth vector lens could be defined as a lens having a null displacement from the depth vector.

The displacement for a supplementary lens may be calculated, for example, as a function of one plus the number of intermediate supplementary lenses between the new lens and the supplemented lens, multiplied by a predetermined displacement increment. In this configuration, supplemented lenses would be located along an orthogonal axis to the depth vector. In the alternative, supplementary lenses may be located along different directions relative to the supplemented lens. Moreover, placement of a lens may be dependent upon the available space on the computer display. Furthermore, no placement information may be stored with a supplementary lens, with the placement thereof determined dynamically during rendering of the abstraction stack. Other manners of locating a supplementary lens relative to a supplemented lens will be apparent to one of ordinary skill in the art.

Once the location of the new lens is determined, block 196 is executed to insert the lens at the inherited depth, and block 198 is executed to insert strata bands between the new lens and either the supplemented lens (if there are no other supplementary lenses) or the nearest intermediate supplementary lens (if such a lens exists). Blocks 196 and 198 may be implemented, for example, using a secondary linked list extending from the supplemented depth vector lens, or in other manners as would be well understood in the art. Next, control is passed to block 192 to issue an open lens event to the new lens, and routine 180 is then terminated.

Figure 10:
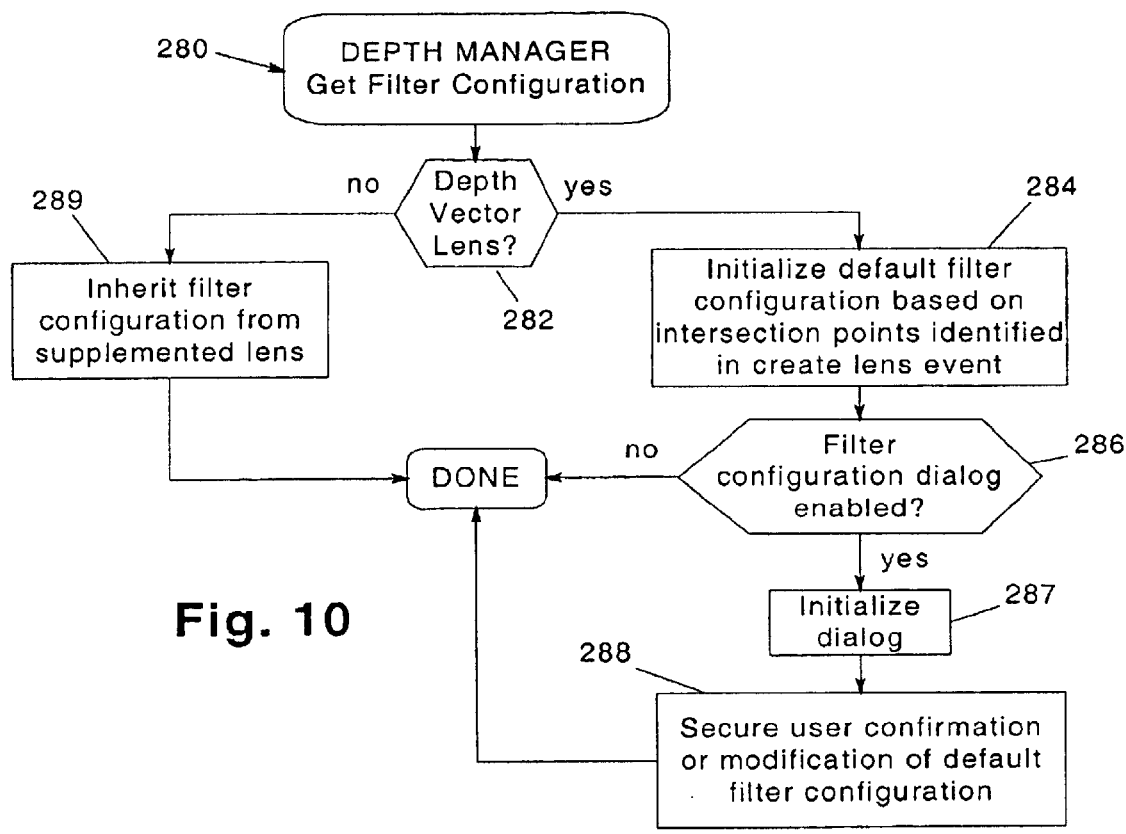
FIG. 10 is a flowchart illustrating the program flow of the get filter configuration routine of FIG. 9.

FIG. 10 illustrates get filter configuration routine 280 in greater detail. As discussed above a filter configuration typically defines if and how each possible level of abstraction will be displayed in the lens. Therefore, a filter configuration typically defines, for each level of abstraction, whether the level will be blocked or passed. Moreover, for each passed level, the filter configuration defines if and how the display of information from that level will be modified using a specific focus effect.

Routine 280 begins in block 282 by determining whether the lens is to be a depth vector lens. If so, control is passed to block 284 to initialize the filter configuration for the new lens to a default configuration. Typically, this is performed in response to the intersection points that are identified in the create lens event. For example, as discussed above, a depth vector lens may be created by selecting one or more intersection points. In these circumstances, a default filter configuration will be set to pass the levels of abstraction represented by the identified intersection points, with all other levels of abstraction blocked by the filter. Moreover, the passed levels will typically be set for normal display, with no specific focus effects applied thereto.

It should be appreciated that for other lens creation actions, different default filter configurations may be used. For example, it may be possible for a user to create a lens that is selected from a list of predefined specialty lenses that is made initially available to a user by the application creator or the body of knowledge author, or by the user in an earlier session with the body of knowledge. In this circumstance, the default filter configuration is based upon the parameters set for the predefined lens.

Once the default filter configuration is set, control is then passed to block 286 to determine whether the filter configuration dialog box is enabled. Typically, the dialog box will be enabled. However, it may be desirable to lock out the dialog box, e.g., if a user is permitted to use only predefined lenses when viewing the abstraction stack, if a user has not been granted authority to perform this operation, or the user has previously saved a set of configurations for this body of knowledge. If the dialog box is disabled, routine 280 terminates, returning the default filter configuration as the filter configuration for the new lens.

If the dialog box is enabled, however, block 287 is executed to initialize the dialog box, and block 288 is executed to secure user confirmation or modification of the default filter configuration. It should be appreciated that blocks 287 and 288 may be performed, for example, by initializing a dialog box object that receives user input and returns to routine 280 at block 288 upon user selection of an appropriate button in the dialog box. In any event, upon return to block 288, routine 280 terminates with optionally modified filter configuration used as the filter configuration for the new lens.

Figure 11:
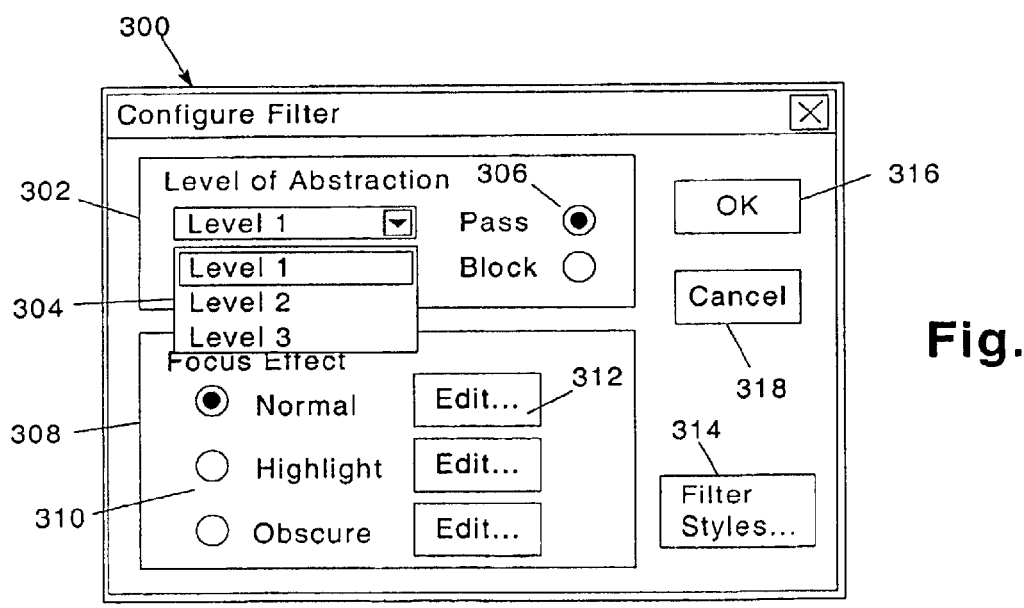
FIG. 11 is a block diagram illustrating a dialog box utilized by the get filter configuration routine of FIG. 10 to input filter settings.

One suitable dialog box 300 for configuration of a lens filter is illustrated, for example, in FIG. 11. Dialog box 300 includes two primary control groups 302 and 308. Control group 302 includes a user interface control 304 such as a drop-down menu for selecting among the available levels of abstraction. Upon selection of any level of abstraction with control 304, the current pass/block status for that level is reflected in a user interface control 306 such as a group of pass and block radio buttons. A user is permitted to modify the pass/block status for the currently selected level by selecting the appropriate radio button, which has the effect of de-selecting the other button.

Control group 308 sets the focus effect for the currently selected level of abstraction using a user interface control 310 such as a set of radio buttons. Since a focus effect is not used for a blocked level of abstraction, it may be desirable to disable (gray out) the controls in control group 308 whenever the current level of abstraction is set to be blocked.

User interface control 310 includes grouped radio buttons reflecting normal, highlight, and obscure focus effects for a level of abstraction. In addition, edit buttons 312 are provided to enable a user to modify the settings for one or more of the focus effect selections. The edit buttons typically open separate dialog boxes that permit the display characteristics for each setting to be customized by a user. The edit buttons may set the display characteristics for all lenses in the abstraction stack, or may set individual display characteristics for the filter's associated lens. Moreover, in the latter case, the user may still be able to set default display characteristics for each setting through additional user input.

A normal setting indicates that information from the level is to be displayed without a special effect. Typically, information displayed in the normal setting has a default font (for text) without any specially-set attributes or a normal representation (for images and other multimedia information). However, it may be possible for a user to set specific display characteristics, e.g., if the user wishes for all text to be displayed in boldface or italics.

A highlight setting indicates that information from the level is to be highlighted in some manner to distinguish the information from that of other levels. Highlighting may be implemented via a special text attribute such as boldface or underlining, or via an increased text size. Also, highlighting may be implemented using a reversed representation (i.e., with the text and background colors switched). For multimedia information such as images, highlighting may be implemented, for example, by highlighting a border thereof, or reversing colors.

An obscure setting indicates that the relative position and size of the information from the level is to be reflected in the lens, but that the actual content of the information is to be de-emphasized or even hidden from the user. The primary purpose for the obscured effect is to represent that the information exists at the predetermined location in the body of knowledge, but that the content of the information is not relevant for the particular filter configuration. For example, an obscure focus effect may be implemented using a pseudo-font, whereby text information is displayed with each character or each word represented by a box or line, or by a single character or icon. Also, the obscure effect may be implement graying out any text and/or multimedia information in a manner well known in the art. Whitespace, whether or not accompanied by a displayed boundary, may also be used. Other manners representing information while obscuring the actual content thereof will be apparent to one of skill in the art.

Another control provided on dialog box 300 is a filter styles button 314, which typically opens another dialog box that permits a user to select between a number of predefined filter configurations as discussed above. In this dialog box, a user may also be able to add, delete and/or modify specific styles using an additional dialog box similar to dialog box 300.

For example, an embedded-interleaved filter may be provided that provides a familiar and comfortable introduction to new information by interleaving elements that address key concepts with embedded and linked graphic and animated examples and illustrations of the concepts, working methods that employ the concepts, and links to related and tangential abstraction stacks. A hotpoint-background filter may be provided to show the relative location and relationship of specific elements to other information in the body of knowledge by highlighting the specific elements and/or obscuring the other information in the body of knowledge.

In addition, a knowledge level filter may be provided that specifically admits information intended for an audience with a capacity to appreciate a specific level of abstraction, e.g., beginner, elementary, general knowledge and expert filters. An overview filter may be provided that only admits information from "higher" levels of abstraction. A working filter may be provided that admits methods or procedures from a body of knowledge, and an example filter may be provided that only admits examples. In addition, if levels of abstraction are defined for specific types of information elements such as headings, glossary terms, index terms, footnotes, body text, etc., different filters such as table of contents filters, heading filters, body filters, footnote filters, glossary filters, index filters, etc. may be developed.

It should further be appreciated that a predefined filter configuration may be developed to highlight or obscure specific information. For example, filters may be defined to highlight index or glossary terms, footnotes, headings, etc. Other filter configurations described herein or otherwise will be apparent to one of skill in the art.

Dialog box 300 also includes return buttons 316 and 318 that a user activates to terminate the dialog box and return control to routine 280. Button 316 is an "OK" button that a user selects when the user is satisfied with the current filter configuration. Button 318 is a "cancel" button that a user selects when the user wishes to discard any changes and return to the previous filter configuration.

It should be appreciated that a wide variety of other user interface mechanisms and organizations may be used to configure a filter consistent with the invention, and that the organization of dialog box 300 is but one of many ways to permit user modification of filter settings. For example, for implementations that utilize multiple abstraction schemes, multiple control groups 302 and 308 may be provided to display each abstraction scheme, or a separate control group may be used to selectively display control groups 302 and 308 with the information for a particular abstraction scheme.

Furthermore, a separate dialog box may be opened prior to opening dialog box 300 to permit user selection of an abstraction scheme. The use of multiple abstraction schemes may be desirable in some applications and thus may be created by an author of a particular body of knowledge. In the alternative, for some bodies of knowledge, inherent abstraction schemes, e.g., via document components or data types, may be used and selected in any of the manners discussed herein.

It should also be appreciated that dialog box 300 may also be opened and utilized by a user after creation of a lens, typically should the user desire to modify the settings for a lens at a later point in time. Modification of a filter configuration may be initiated in any number of manners, e.g., via a button or menu associated with a particular lens, or in other manners known in the art.

Figure 12:
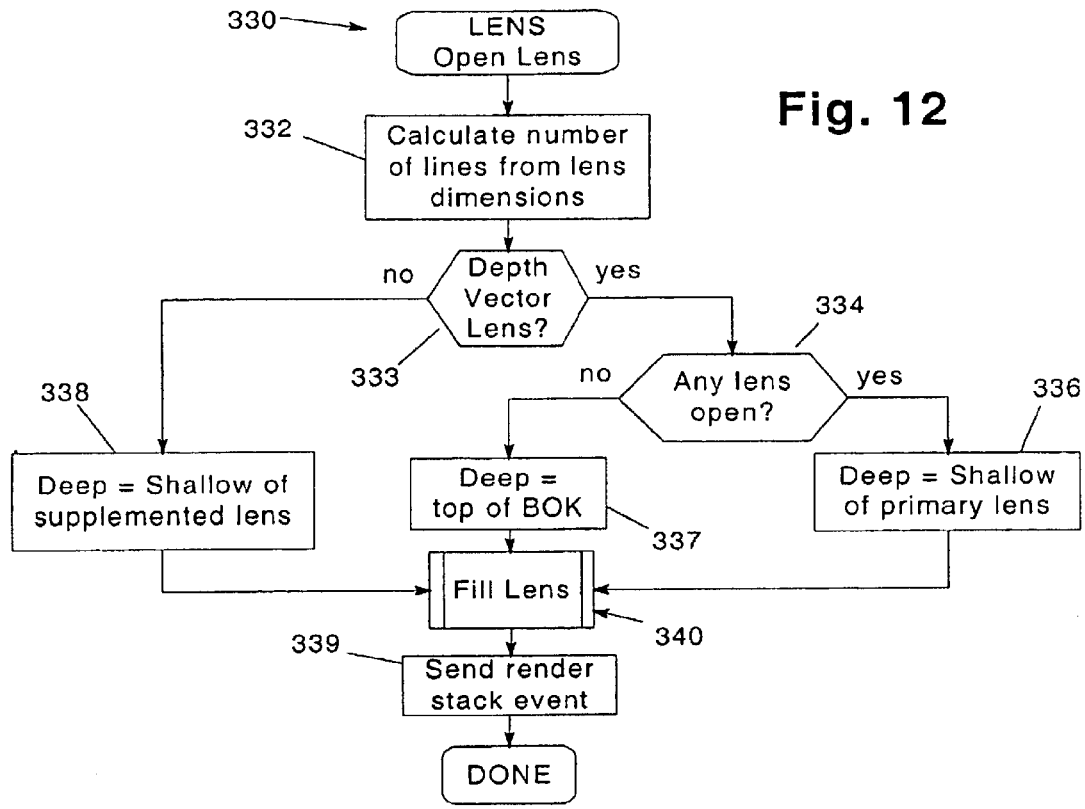
FIG. 12 is a flowchart illustrating the program flow of the open lens routine of FIG. 9.

An open lens routine 330 that handles an open lens event for a lens is illustrated in FIG. 12. An open lens is generally any lens that is not minimized (such as a minor lens), and which displays a portion of the body of knowledge. As will become more apparent below, each lens is defined to include shallow and deep bounds, representing the boundaries of the lens in terms of start and end locations in the body of knowledge. Each lens includes a plurality of lines of information, with each line having associated therewith a body of knowledge count representative of the size of the portion of the body of knowledge represented in that line. Since portions of the body of knowledge may be filtered out via the filter for each lens, it should be appreciated that each line displayed in a lens may represent a different quantity of information in the body of knowledge. Accordingly, it is desirable to maintain the shallow and deep bounds in terms of locations within the body of knowledge, and thus, independent of the particular information displayed in a lens.

It should also be appreciated that the implementation discussed herein is limited principally to use with a body of knowledge formed of textual information, with only a limited concern for formatting and layout details, to facilitate a better understanding of the basic concepts of the invention. As such, lines of information within a lens typically include one or more words of text from a body of knowledge, with each body of knowledge segment carrying textual data as well as a count of the portion of the body of knowledge represented by the textual data in the segment along with any information elements that are blocked by a lens filter during assembly of the segment. However, other embodiments consistent with the invention may be designed to handle other types of information such as graphics and other multimedia data and executable data, typically by incorporating various web browser and what-you-see-is-what-you-get (WYSIWYG) editing layout and information presentation concepts to handle the discipline-specific details for formatted text, text frames, graphics frames, page layout, graphics images, video, animation and audio clips, user interface controls, etc. For example, the aforementioned incorporated application entitled "COMPUTER SYSTEM AND METHOD FOR CONTROLLING THE SAME UTILIZING A USER INTERFACE CONTROL INTEGRATED WITH MULTIPLE SETS OF INSTRUCTIONAL MATERIAL THEREFOR" discloses one suitable implementation for handling multiple information types. Thus, it should be appreciated that the invention should not be limited to the text-based implementation disclosed herein.

Routine 330 begins in block 332 by calculating the number of lines for the lens based upon its current dimensions. The dimensions that may affect the number of lines displayed include the height and width of a lens, as well as an optional zoom factor for the lens that determines the size of the information that will be displayed therein. In addition, the number of lines for the lens may be dependent upon the font size for textual information displayed in any given focus effect (e.g., normal, highlighted, or obscured). Calculation of the number of lines to display in a window, however, is a routine operation that is well known in the art.

Next, block 333 is executed to determine whether the lens is a depth vector lens. If it is, block 334 is executed to determine whether any lens in the current lens set is already open. If so, block 336 is executed to set the deep bound for the lens to initially be equal to the shallow bound for the primary lens in the current lens set. If not, block 337 is executed to set the deep bound for the lens to initially be equal to the top of the body of knowledge. Returning to block 333, if the lens is a supplementary lens, block 338 is executed to set the deep bound for the lens to initially be equal to the shallow bound of the supplemented lens therefor.

After execution of any of blocks 336, 337 or 338, a fill lens routine 340 is called to fill the lens with information, and a render stack event is issued in block 339 to execute render stack routine 160 of FIG. 7. Routine 330 is then complete.

Figure 13:
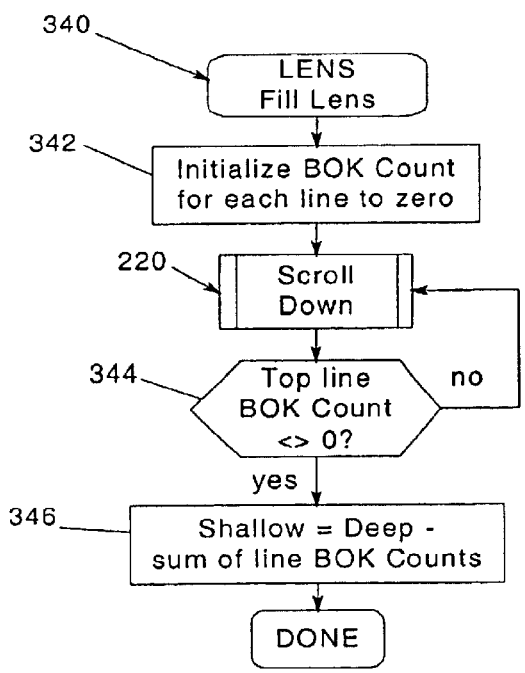
FIG. 13 is a flowchart illustrating the program flow of a fill lens routine for the lens of FIG. 4.

Fill lens routine 340, which is illustrated in greater detail in FIG. 13, generally operates to push lines of information from the body of knowledge sequentially into the bottom of the lens until the lens is full of information. Routine 340 receives a deep bound that initially points to the start location for the lens in the body of knowledge. The initial value stored in the shallow bound is not important, as routine 340 updates this value prior to termination. As will become apparent below, the deep bound is automatically updated as information is pushed into the bottom of the lens such that, upon completion of routine 340, the deep bound points to the end location for the lens in the body of knowledge.

Routine 340 begins in block 342 by initializing the body of knowledge count for each line in the lens to zero. Next, a scroll down routine 220 is called to push a line of information into the bottom of the lens, while calculating a body of knowledge count for the line and updating the deep bound accordingly. Next, block 344 determines whether the body of knowledge count for the top line of the lens is no longer zero, indicating that the lens is full of information. If not, routine 220 is again called until the lens is full. Once the lens is full, block 346 is executed to update the shallow bound for the lens to be equal to the deep bound of the lens less the sum of the body of knowledge counts for all lines in the lens. Routine 340 is then complete. It should be appreciated that, in the alternative, the fill lens routine may use a scroll up operation to sequentially push information into the top of the lens.

Figure 14:
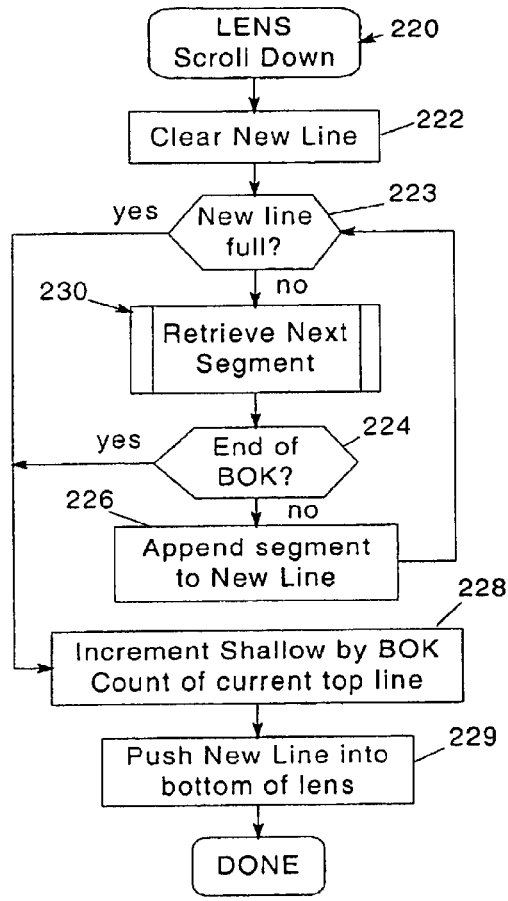
FIG. 14 is a flowchart illustrating the program flow of the scroll down routine of FIG. 13.

FIG. 14 illustrates scroll down routine 220 in greater detail. Routine 220 begins in block 222 by clearing a new line buffer that is subsequently built by the routine and pushed into the bottom of the lens. Next, block 223 determines whether the new line is full. As the new line has recently been cleared, this test fails, and accordingly, routine 230 is called to retrieve a next (succeeding) segment from the body of knowledge. The next segment retrieved from the body of knowledge may represent a predetermined quantity of information from the body of knowledge that is not filtered out by the filter for the associated lens. In addition, if the end of the body of knowledge has been encountered when attempting to retrieve the next segment, this indicator is returned from routine 230. Accordingly, block 224 determines upon completion of routine 230 whether the end of the body of knowledge indicator has been returned. If it has not, the returned segment is appended to the new line in block 226, and control is returned to block 223 to determine whether the new line is full of information.

The retrieval of segments from the body of knowledge occurs until such time as the end of the body of knowledge is encountered (as represented by block 224) or until such time as a full line of information has been appended to the new line buffer (as represented by block 223). In either case, control is passed to block 228 to increment the shallow bound for the lens by the body of knowledge count of the current top line displayed in the lens, in effect removing the existing top line from the lens.

After the shallow bound of the lens has been incremented, control passes to block 229 to push the new line into the bottom of the lens, an operation that is generally well understood in the art. Accordingly, on the next refresh operation on the lens, the new line retrieved from the body of knowledge will be displayed at the bottom of the lens, with the previous top line of the lens discarded by virtue of the increment of the shallow bound of the lens. Routine 220 is then complete.

Figure 15:
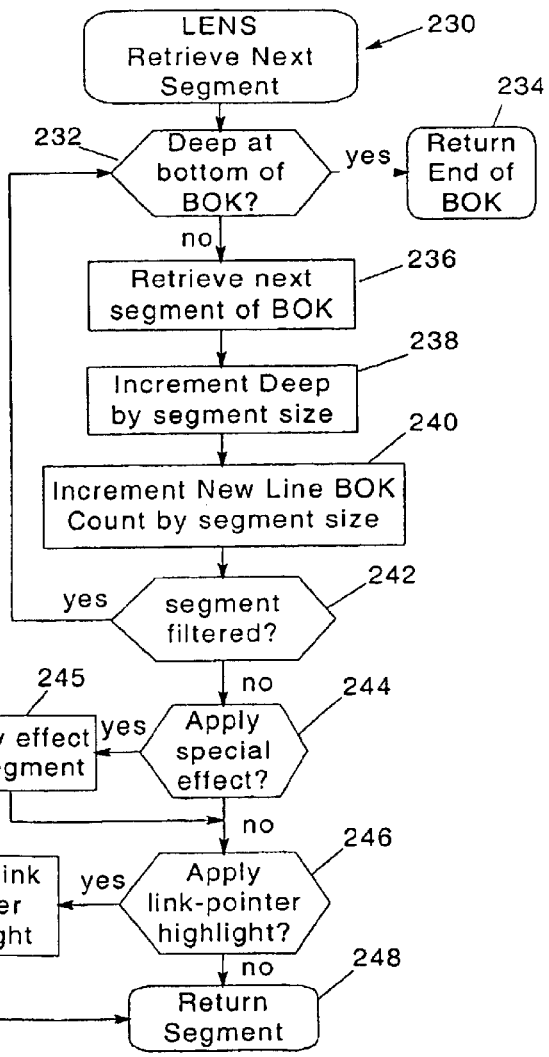
FIG. 15 is a flowchart illustrating the program flow of the retrieve next segment routine of FIG. 14.

Retrieve next segment routine 230 is illustrated in greater detail in FIG. 15. Routine 230 begins in block 232 by determining whether the deep bound of the lens is located at the bottom or end of the body of knowledge. If so, an end of body of knowledge indicator is returned in block 234 and routine 230 is complete. If, however, the deep bound of the lens is not at the end of the body of knowledge, control passes to block 236 to receive a next (succeeding) segment in the body of knowledge. The next segment is of a fixed, predetermined quantity of information in the body of knowledge, and is at this point unfiltered by the lens. The size of the segment may be as little as a single bit, or more typically, may be one or more bytes of information. In addition, segments may represent full information elements in certain embodiments, since it is assumed that all the information in an information element is associated with the same level of abstraction and named concept, and thus will be treated similarly by the lens filter. In this latter instance, however, a buffer may be needed to partition information elements into segments having at most one line of information.

After the segment is retrieved, control passes to blocks 238 and 240 to respectively increment the deep bound for the lens by the segment size, and to increment the body of knowledge count for the new line by the segment size. Next, block 242 determines whether the segment is filtered by the filter associated with the lens. If it is, it is not desirable to display this segment in the lens, and accordingly, control is passed to block 232 to retrieve another segment from the body of knowledge if possible. Accordingly, it will be appreciated that the loop initiated by blocks 232–242 scans down through the body of knowledge until a non-filtered segment is retrieved. However, during this scan, the body of knowledge count for the new line, and the location of the deep bound in the body of knowledge, is maintained so that the filtered information, while not displayed, is nonetheless accounted for in the body of knowledge.

Once an unfiltered segment is retrieved, block 242 passes control to block 244, which determines whether it is necessary to apply a special (focus) effect to the segment based upon the current filter configuration associated with the lens. If so, control is diverted to block 245 to apply the effect to the segment. As discussed above, for example, different effects may be applied to information associated with the various levels in a lens so that different levels of abstraction may be distinguished in the lens.

Irrespective of whether a special effect is applied to the segment, control then passes to block 246 to determine whether a link pointer highlight should be applied to the segment, and if so, diverts control to block 247 to apply the highlight to the segment. As will be discussed in greater detail below, a link pointer highlight is typically applied to a segment if the segment is (1) unfiltered and (2) associated with a named concept that is associated with the information element at which the pointer is currently pointing. Next, irrespective of whether a highlight is applied to the segment, the segment is returned in block 248, and routine 230 is terminated.

Figure 16:
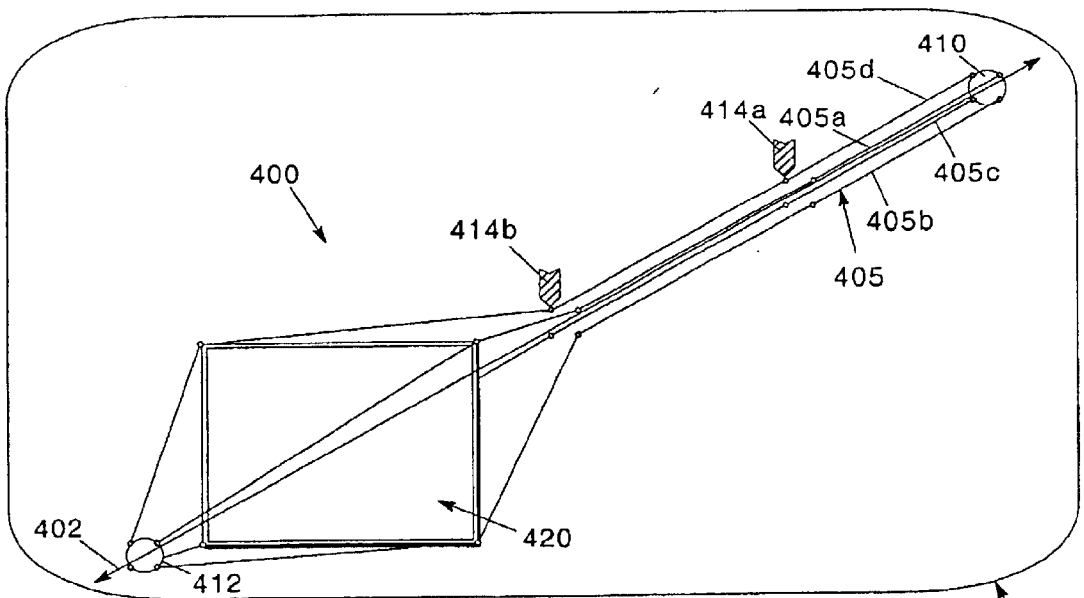
FIG. 16 is a block diagram of the computer display of FIG. 8 after creation of a depth vector lens.

As an example of the creation and opening of a lens, FIG. 16 illustrates the addition of an open lens 420 to abstraction stack 400 upon completion of create lens routine 180 and open lens routine 330. Lens 420 as shown has been created by selecting all of intersection points 414a–414c such that levels 1–3 of the body of knowledge are passed by the lens filter. The lens is initially placed at the focal plane represented by intersection point 414c (which has been deleted in FIG. 16). Moreover, the orientation of shaft bands 405 has been adjusted to extend to the corners of lens 420, with lens 420 centered on depth vector 402. Furthermore, as this is the first open lens, the lens becomes the sole member of the lens set, and thus also becomes a primary lens that receives user input.

A number of alternatives and additions exist. For example, all intersection points may be displayed regardless of whether any associated lenses have been created, and thus, intersection point 414c could be displayed in FIG. 16. In addition, some alphanumeric or iconic identifier may be used on each lens to represent the included levels therefor. (e.g., for lens 420 illustrating three icons in the title bar thereof representing the three levels of abstraction passed thereby).

Figure 17:
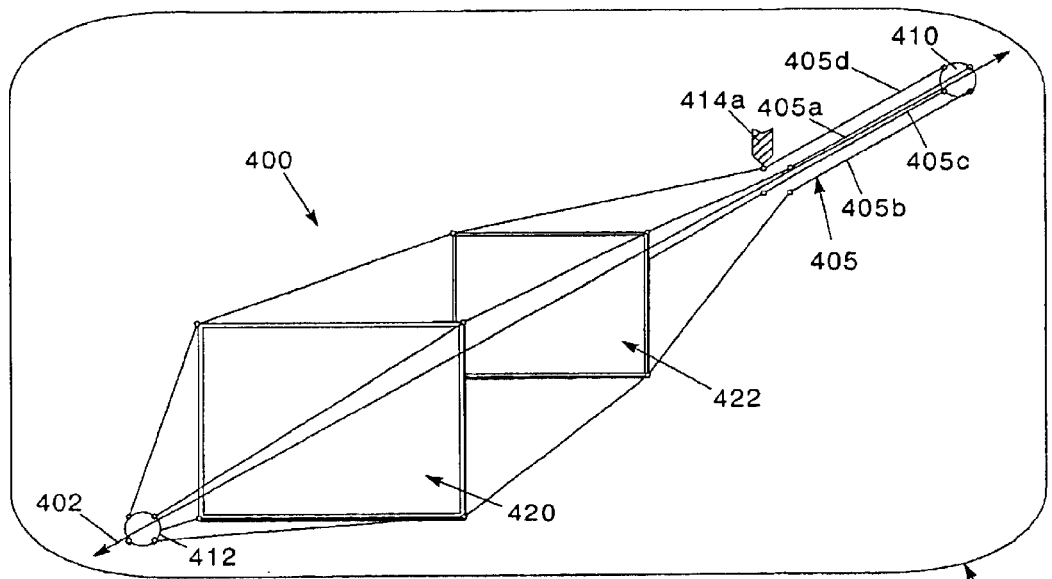
FIG. 17 is a block diagram of the computer display of FIG. 16 after creation of a secondary depth vector lens.

FIG. 17 illustrates the creation and opening of a secondary lens 422 subsequent to the creation of lens 420. In this example, secondary lens 422 is created in response to selection of intersection points 414a and 414b such that the filter configuration for the lens is set to pass levels 1 and 2 but to block level 3. The lens is placed at the focal plane represented by intersection point 414b (which has been deleted in FIG. 17). Moreover, the orientation of shaft bands 405 has been adjusted to extend to the corners of lens 422. While the lens is added to the lens set, it is preferable to keep lens 420 as the primary lens for receiving user input. In the alternative, creation of a new lens in a lens set may set the new lens to the primary lens if desired.

Figure 18:
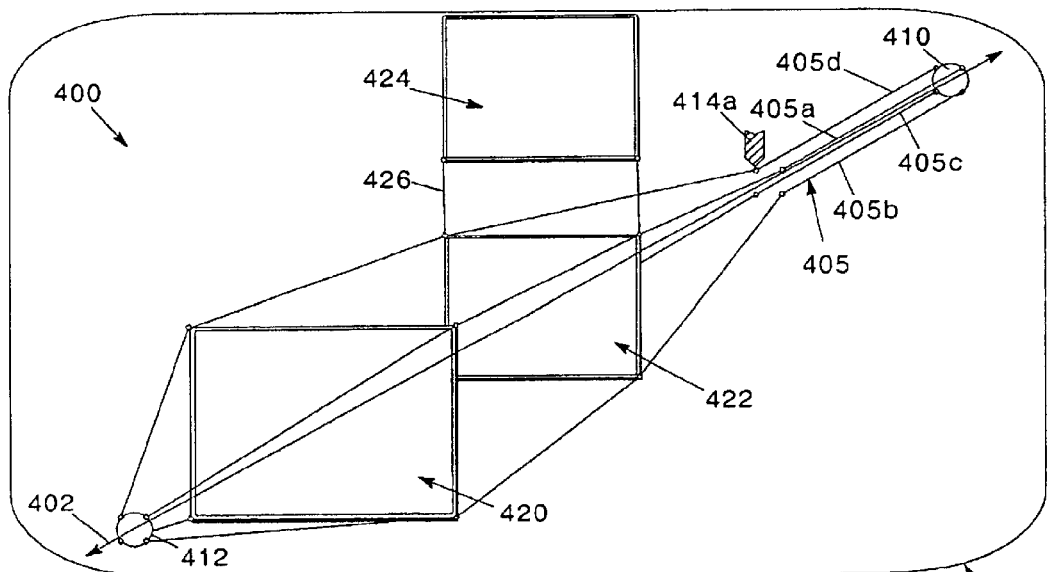
FIG. 18 is a block diagram of the computer display of FIG. 17 after creation of a supplemental lens.

FIG. 18 illustrates the creation and opening of a supplementary lens 424 that supplements lens 422. Supplementary lens 424 inherits the filter configuration of lens 422, but is independently scrollable to display other portions of the body of knowledge in the same representation as lens 422. Strata bands 426 (which may only connect a portion of the corners of lenses 422 and 424) extend between the lenses, and lens 424 is disposed at the same depth as lens 422, albeit displaced therefrom in the same plane. While only one supplementary lens 424 is illustrated in FIG. 18, it should be appreciated that in some embodiments, creation of a supplementary lens to supplement a lens in a particular lens set may also induce creation of a supplementary lens for every other lens in the supplemented lens set.

Coordinated Scrolling

One important aspect of the user interface utilized with abstraction stack 50 is that of coordinating the display of information in multiple lenses of a lens set. As discussed above, a primary lens in a lens set is that which is configured to receive user input, similar to the active window in a GUI environment. Any scroll operation performed on the primary lens which modifies the information from the body of knowledge that is displayed in the lens typically must induce a similar scrolling operation in each secondary lens in a lens set such that the display of the information from the body of knowledge is coordinated across the various lenses.

Returning to FIG. 5, one additional event that may be handled by the event manager is that of handling a scroll event. Such an event, which is detected in block 112 and handled by handle scroll routine 200, may be initiated in any number of manners known in the art. For example, the primary lens may include conventional scroll bar objects that permit unit and/or block increment and decrement operations. Moreover, scroll events may be generated by keyboard input, or through specific menu or tool bar button operations, such as a request to go to a particular location in a document. In addition, if search functions are provided for a primary lens, scroll-like events may be generated that request that a particular location in a body of knowledge be displayed in the lens set.

Figure 19:
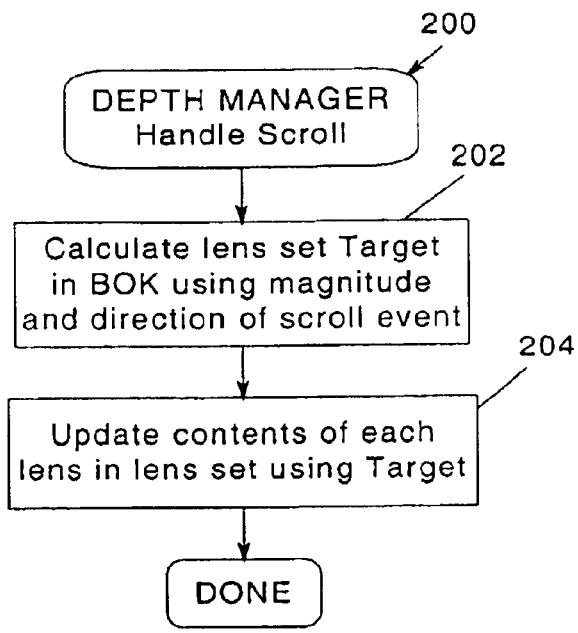
FIG. 19 is a flowchart illustrating the program flow of the handle scroll routine of FIG. 5.

Handle scroll routine 200 is illustrated in greater detail in FIG. 19. Generally, routine 200 begins in block 202 by calculating a target in the body of knowledge for the lens set based upon the magnitude and direction supplied in a scroll event. As discussed above, each lens set has associated therewith a current location in the body of knowledge. Based upon the magnitude and direction of the scroll event, a new target location in the body of knowledge may be calculated. For example, it will be known the scroll increment for the primary lens, as well as the current value of the primary lens' shallow and deep bounds. Based upon the information in the scroll event, therefore, a new location in the body of knowledge may be calculated. Depending upon whether the scroll event is for a unit or block increment, or whether the scroll event is a request to go to a particular location in the body of knowledge, the target location in the body of knowledge may be calculated in a routine manner.

For example, the target location may be set by performing a pre-scroll on a temporary (non-displayed) copy of the primary lens, then setting the target to point to the last new segment appended or prepended to the last line built in the pre-scroll. Knowing how many lines should be pushed into the lens, as well as line height, font size, etc., and then finding out how much of the filtered body of knowledge would be used to fill the lens enables determination of the target location.

Once the target location in the body of knowledge has been calculated, control passes to block 204 to update the contents of each lens in the lens set to display the target location in the body of knowledge. Typically, this operation is performed by passing an update contents event to each open lens in a lens set such that each lens may handle the update event accordingly. In this event, the new target location in the body of knowledge is supplied to each lens. Then, after the event has been initiated for each lens, routine 200 is complete.

Figure 20:
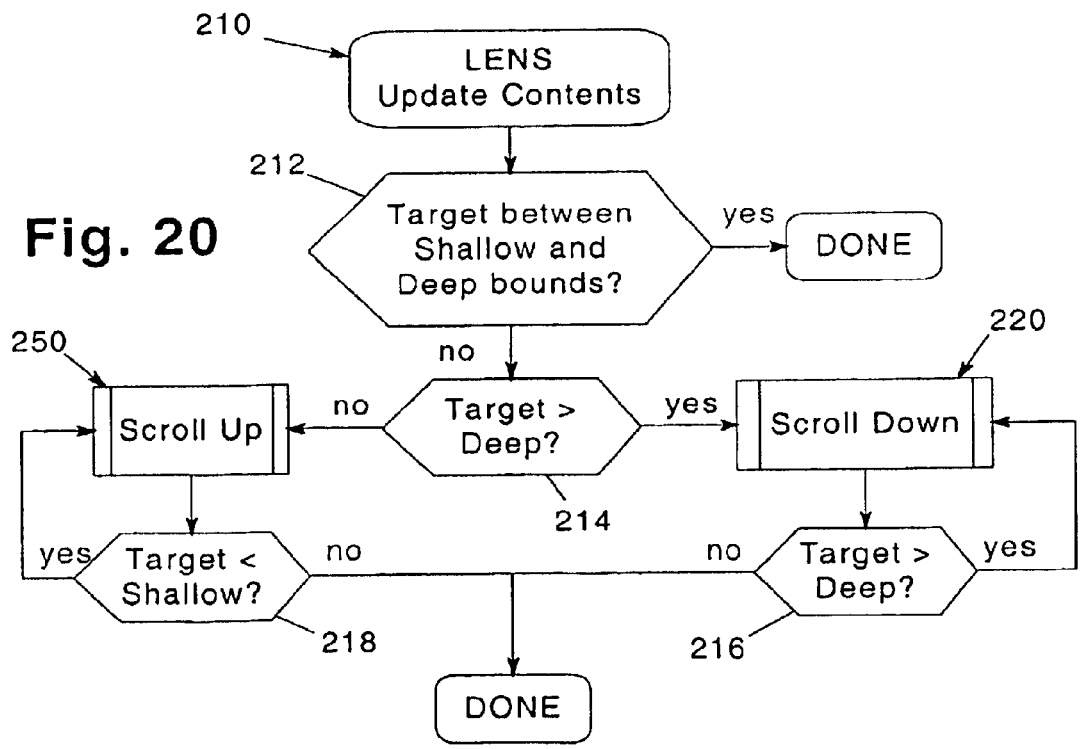
FIG. 20 is a flowchart illustrating the program flow of an update contents routine for the lens of FIG. 4.

Each lens receives an update contents event and handles such event accordingly using an update contents routine 210 illustrated in FIG. 20. Routine 210 begins in block 212 by determining whether the target location in the body of knowledge (supplied in the event) is between the shallow and deep bounds for the lens. If so, no scroll of the lens is required, and routine 210 terminates. If, however, the target is not between the shallow and deep bounds for the lens, control passes to block 214 to determine whether the target location is beyond the deep bound of the lens.

If so, block 214 calls scroll down routine 250 of FIG. 14 to scroll down a predetermined increment, here a line, into the body of knowledge (which also has the effect of moving the deep bound down through the body of knowledge). As discussed above, routine 250 generally operates by retrieving a new line of information from the body of knowledge adjacent the deep bound of a lens and pushes the new line of information into the bottom of the lens. Concurrently with retrieving a new line of information, the shallow and deep bounds of the lens are adjusted and a body of knowledge count is calculated for the new line.

Returning to FIG. 20, after a new line has been pushed into the lens, block 216 is executed to determine whether the target is still beyond the deep bound for the lens. If so, routine 250 is again called to scroll further down in the body of knowledge. Routine 250 is therefore called until such time as the target location in the body of knowledge is no longer beyond the deep bound for the lens. After the target is no longer beyond the deep bound for the lens, routine 210 terminates.

Returning to block 214, if the target is not beyond the deep bound, it is assumed that the target is above the shallow bound for the lens. Accordingly, the lens must be scrolled up in the body of knowledge to locate the target, so a scroll up routine 220 is called to scroll a predetermined amount, here a line, up into the body of knowledge (which also has the effect of moving the shallow bound up through the body of knowledge). Next, block 218 is executed to determine whether the target is still above the shallow bound of the lens. If so, block 218 loops back to again call routine 220 until such time as the target is no longer above the shallow bound for the lens. Once this latter condition occurs, routine 210 is complete.

Figure 21:
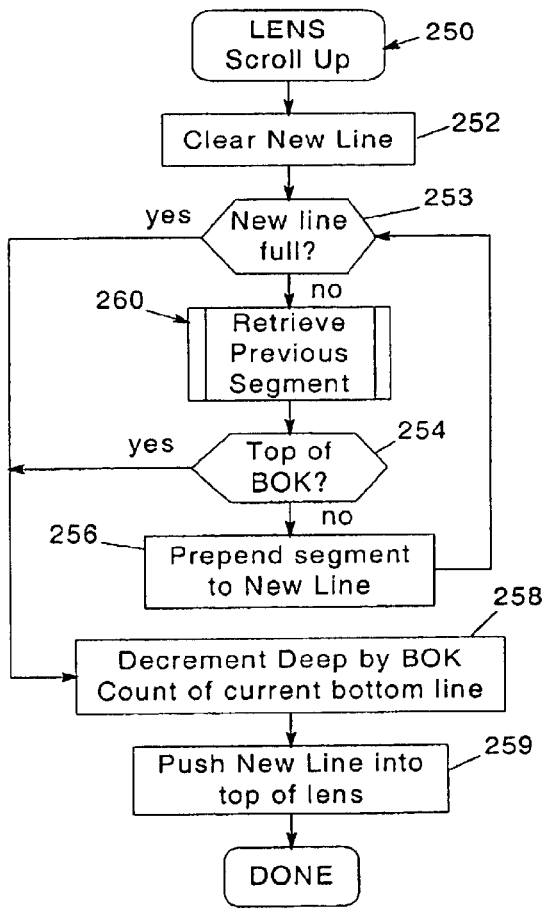
FIG. 21 is a flowchart illustrating the program flow of the scroll up routine of FIG. 20.

FIG. 21 illustrates scroll up routine 250 in greater detail. Routine 250 operates in generally the same manner as routine 220 of FIG. 14. Specifically, routine 250 begins in block 252 by clearing a new line buffer. Next, a loop is initiated in block 253 that calls a retrieve previous segment routine 260 and prepends the retrieved segment to the new line buffer in block 256. The loop continues until either block 253 determines that the new line buffer is full, or until block 254 determines that a top of body of knowledge indicator has been returned from routine 260. In either event, control is then passed to block 258 to decrement the deep bound for the lens by the body of knowledge count of the current bottom line in the lens, and then to block 259 to push the new line into the top of the lens. Routine 250 is then complete.

Figure 22:
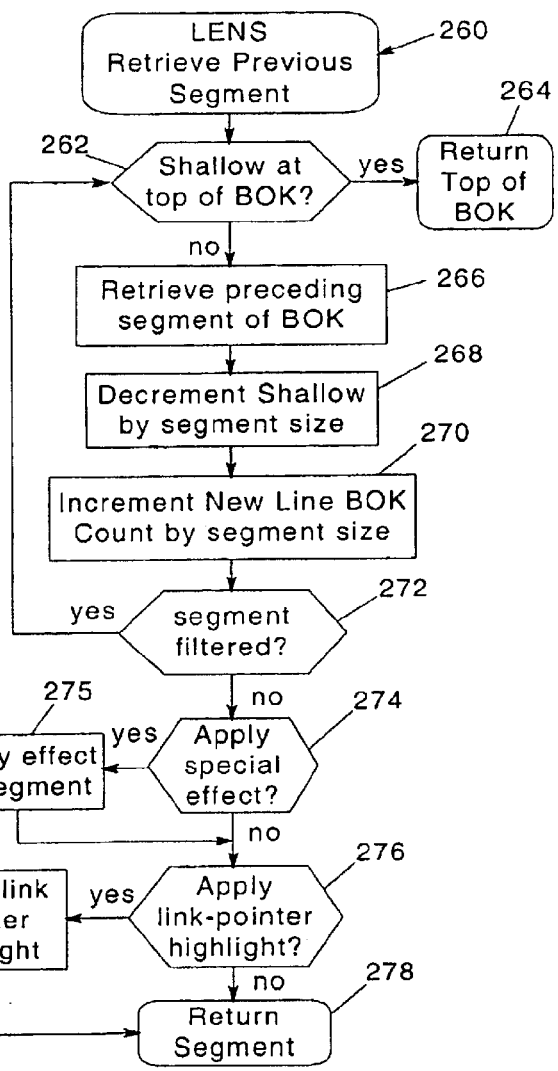
FIG. 22 is a flowchart illustrating the program flow of the retrieve previous segment routine of FIG. 21.

Retrieve previous segment routine 260, which is illustrated in greater detail in FIG. 22, operates in much the same manner as retrieve next segment routine 230 of FIG. 15. Routine 260 initiates a loop in block 262 that retrieves preceding segments of the body of knowledge until such time as an unfiltered segment is returned, or until the top of the body of knowledge is encountered. If the top of the body of knowledge is encountered (i.e., if the shallow bound points to the top of the body of knowledge), block 262 returns an indicator to that effect and terminates the routine in block 264. If, however, the top of the body of knowledge is not encountered, block 266 is executed to retrieve the previous segment in the body of knowledge. Then, blocks 268 and 270 are executed to decrement the shallow bound for the lens by the predetermined segment size, and to increment the new line body of knowledge count by the segment size. Block 272 then determines whether the retrieved segment is filtered, and if so, passes control to block 262 to receive an additional segment. If, however, the segment is not filtered, control passes to block 274 to determine whether a special effect must be applied to the segment, and if so, diverts control to block 275. Irrespective of whether a special effect is applied to the segment, control is next passed to block 276 to determine whether a link pointer highlight should be applied to the segment (discussed below), and if so, diverts control to block 277. Irrespective of whether a highlight is applied to the segment, control is then passed to block 278 to return the segment and terminate the routine.

Figure 23:
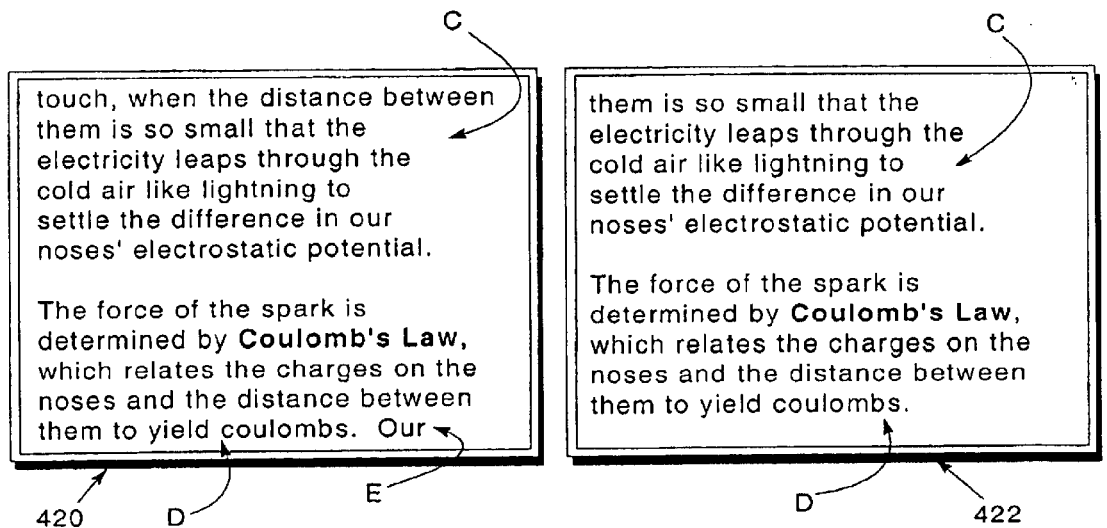
FIG. 23 is a block diagram illustrating primary and secondary lenses displaying portions of the exemplary body of knowledge.
Figure 24:
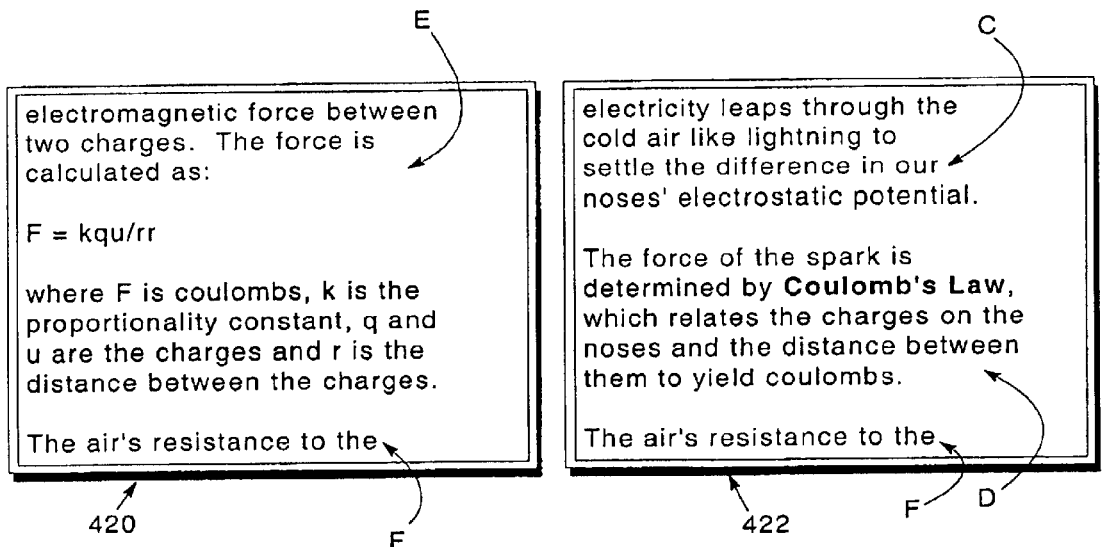
FIG. 24 is a block diagram illustrating the primary and secondary lenses of FIG. 23, after performance of a scroll down operation.

FIGS. 23 and 24 illustrate a scroll down operation on the example body of knowledge of Tables I and II. For example, a primary lens 420 is illustrated in FIG. 23 that is either unfiltered or at least has a filter that passes information elements from levels 1–3. A secondary lens 422, however, includes a filter that excludes information elements from level 3. Accordingly, it may be seen that, at the position in the body of knowledge illustrated in FIG. 23, primary lens 420 displays information elements C and D, as well as the beginning of information element E. Secondary lens 422, however, filters out information element E, and displays only information elements C and D, with a blank line disposed below information element D representing the separation between the end of the paragraph for elements D & E and the beginning of paragraph F. The blank characters at the end of the last line in element D represent the filtered content of information element E.

As shown in FIG. 24, as a user scrolls down through the content of information element E in primary lens 420, secondary lens 422 is unchanged, displaying the same information as previously displayed in FIG. 23. However, when a user has scrolled down in the primary lens to the first line of information element F (which is a level 2 information element), secondary lens 422 is also scrolled down a line to maintain the coordination between lenses 420 and 422. Any continued scrolling down through information element F would result in scroll operations on both lenses 420 and 422 until the first line of information element G is located, whereby this information element would also be filtered from secondary lens 422.

Figure 25:
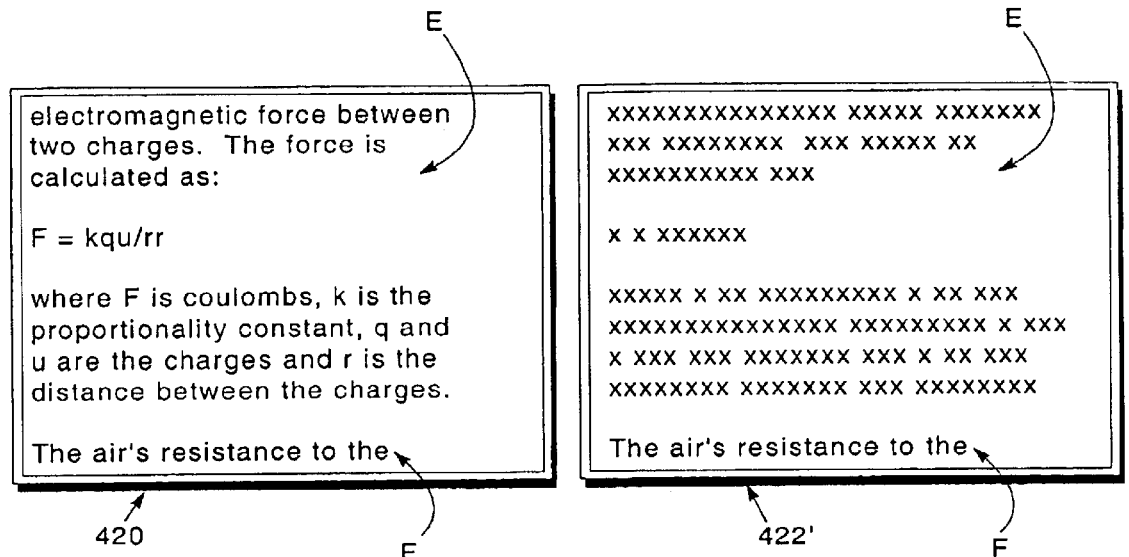
FIG. 25 is a block diagram illustrating the primary and secondary lenses of FIG. 23, showing a focus effect applied to the secondary lens.

FIG. 25 illustrates an alternate secondary lens 422' which displays the same content as secondary lens 422 of FIG. 24, but with a special effect applied such that information element E is displayed in the secondary lens, but now using a focus effect special effect where the content of the information element is obscured to represent the relationship of the element to the other information elements displayed in the lens but without displaying the actual content of the information element. This filter is generally representative of one implementation of the hotpoint-background filter described above with reference to Fig. I1. Other effects discussed herein may also be applied in a similar manner.

Link Pointer

Another important aspect of the user interface utilized with abstraction stack 50 is that of linking together information elements relating to named concepts. This is typically performed through the use of a link pointer, which typically is implemented using a specific link pointer mode for the pointer that is controlled via the mouse or other user interface device. Essentially, movement of a link pointer over an information element directed to a specific named concept results in the highlighting of other displayed information elements matching the named concept. Typically, but not necessarily, link pointer operation is limited to moving a pointer over an information element in the primary lens of a lens set.

For example, in one preferred implementation, cross-over events are generated in response to a user moving a pointer over a particular information element in the primary lens. The cross-over events are handled by the depth manager and placed into a queue under predetermined circumstances. An event manager in the queue issues highlight events to each lens in a lens set that is capable of displaying information elements associated with the named concept to highlight those information elements. In response, each lens processes the highlight event to update its display accordingly.

Figure 26:
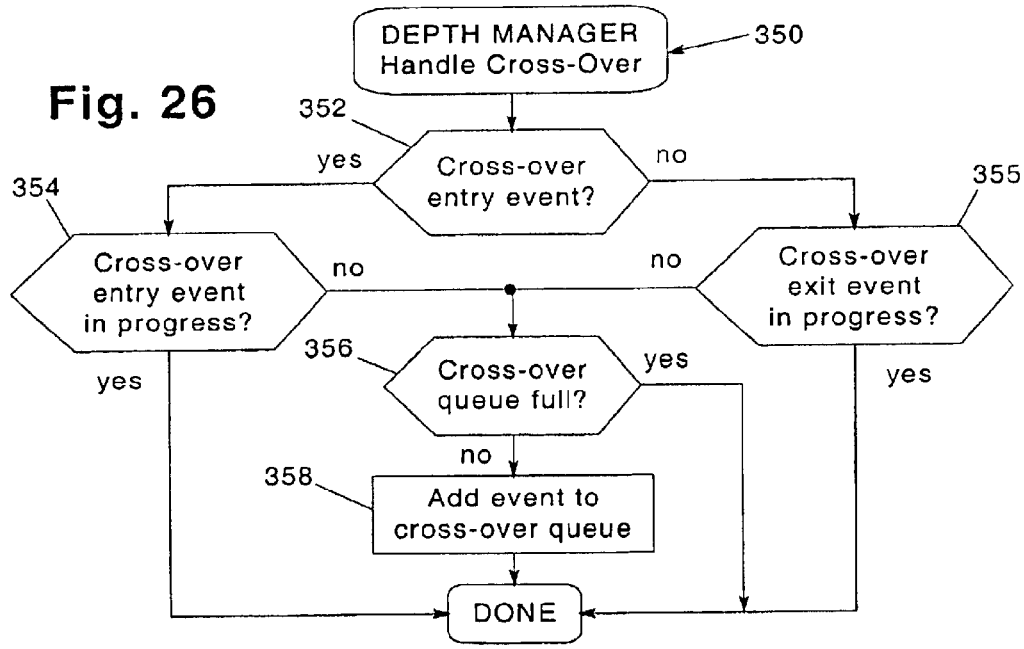
FIG. 26 is a flowchart illustrating the program flow of the handle cross-over routine of FIG. 5.

For example, a handle cross-over routine 350 that handles a cross-over event is illustrated in greater detail in FIG. 26. Routine 350 begins in block 352 by determining whether the cross-over event is an entry event (where the pointer has moved from a position outside of an information element to a position over the information element) or an exit event (where the pointer has moved off of an information element). If the event is an entry event, control passes to block 354 to determine whether a cross-over entry event is currently being processed. If it is, routine 350 terminates. If, however, no event is being processed, control passes to block 356 to determine whether a single entry cross-over queue is full—that is, whether a pending event is stored in the queue. If so, routine 350 terminates. If not, the event is added to the cross-over queue in block 358 prior to terminating routine 350.

Returning to block 352, if the event is an exit event, block 355 is executed to determine whether an exit event is currently being processed. If so, routine 350 terminates, and if not, control is passed to block 356 to add the event to the queue if the queue is empty.

The placement of an event on the cross-over queue generates an event entry event that is handled by a handle event entry routine 360 illustrated in FIG. 27. Routine 360 begins in block 361 by removing the event entry from the queue. Next, block 362 determines whether the event is a cross-over entry event. If so, block 363 is executed to set an Entry In Progress flag, indicating that an entry event is currently being processed. It is generally this flag that is tested in block 354 of FIG. 26.

Next, block 364 is executed to create a list of secondary lenses having at least one unfiltered information element associated with the named concept specified in the event (the named concept of the crossed-over information element in the primary lens). Next, block 366 generates a target offset in the body of knowledge to the named concept in the primary lens. Next, link pointer highlighting of the named concept is enabled in block 368, e.g., by setting a flag associated with the named concept. Next, block 370 is executed to send a highlight event to the primary lens and the list of secondary lenses such that each lens updates its display to highlight the information element therein corresponding to the named concept. Next, block 372 clears the Entry In Progress and Exit In Progress flags, and routine 360 terminates.

Returning to block 362, if the entry in the queue is for an exit event, control passes to block 373 to set an Exit In Progress flag, indicating that an exit event is currently being processed. Block 374 is then executed to disable all link pointer highlighting, e.g., by clearing all flags associated with named concepts. Next, control is passed to block 370 to issue the highlight events in the manner described above, prior to clearing the In Progress flags in block 372 and terminating the routine.

A highlight event handling routine 375 is illustrated in greater detail in FIG. 28. Routine 375 begins in block 376 by determining whether the target location in the body of knowledge that is specified in the event is between the shallow and deep bounds for the lens. If so, no scrolling of the lens is required, so the deep bound for the lens is set to the value of the shallow bound in block 378, and fill lens routine 340 is called to refresh the contents of the lens, after which routine 375 is complete. By setting the deep bound to the shallow bound, the deep and shallow bounds for the lens will be the same after the highlight event as they were before the event was processed. However, after the fill routine, the highlight status of the named concept will either be set or cleared based upon the flag set therefor in routine 360 discussed above with reference to FIG. 27 (see, e.g., blocks 246–247 of routine 230 in FIG. 15, and blocks 276–277 of routine 260 in FIG. 22).

Returning to block 376, if the target is not between the shallow and deep bounds for the lens, update contents routine 210 of FIG. 20 is called to scroll the lens as necessary to display the target location in the body of knowledge. Concurrent with this scrolling, the contents of the lens are refreshed to reflect the highlighted status thereof, as discussed above. Routine 375 is then complete. It should be appreciated that, in the alternative, no coordinated scrolling may be performed in response to a cross-over event, and thus, it may not be necessary to separately call the update contents routine to update a lens to display information elements related to the named concept but not currently displayed in the lens.

A named concept may be associated with only one information element, so that only one element is highlighted in any given lens. In the alternative, multiple information elements may be associated with a named concept, so that multiple information elements may be highlighted at any given time in a lens. In this latter instance, it should be appreciated that the determination of a target location places the target location specifically on the information element that initiated the event.

Figure 29:
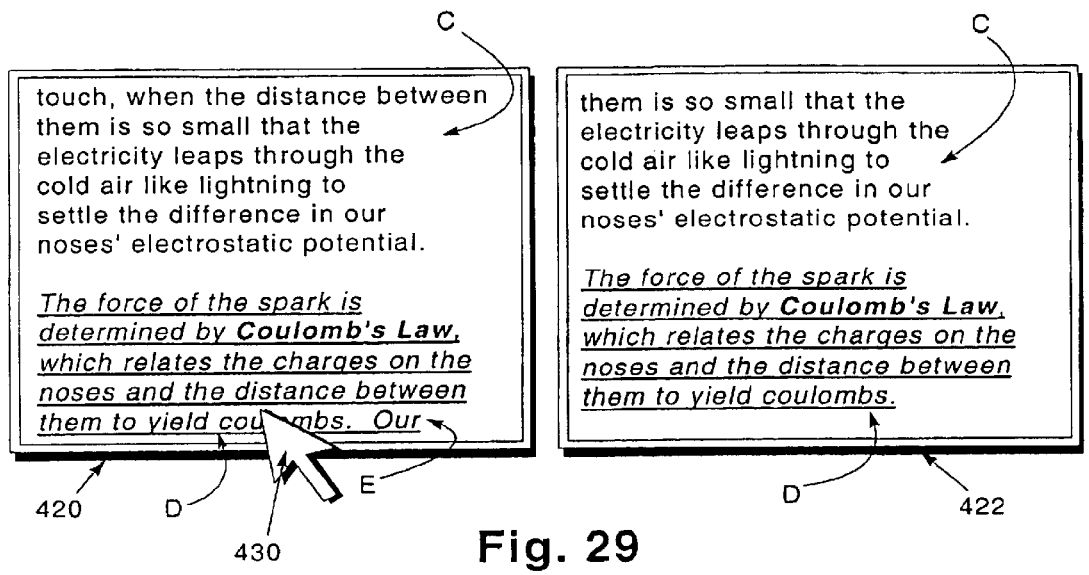
FIG. 29 is a block diagram illustrating the primary and secondary lenses of FIG. 23, showing a link pointer highlight applied to a named concept.

FIG. 29 illustrates as an example the primary and secondary lenses 420 and 422 described above with reference to FIG. 23. In this instance, a pointer 430 placed in link pointer mode has crossed-over information element D, associated with the named concept "coul" (see Table II). In response, information element D is highlighted in both of lenses 420 and 422. Moreover, information element E, which is also associated with the "coul" named concept, is also highlighted in lens 420. After a cross-over exit event is generated from the pointer moving off of information element D, it should be appreciated that the visual display of information elements D and E in lenses 420 and 422 would return to that illustrated in FIG. 23.

Additional Controls and Manipulation Operations

Additional user interface controls and operations may be implemented in an abstraction stack consistent with the invention. A number of these controls and operations are discussed below with reference to FIGS. 30 and 31. The implementation of these controls and features in a graphical user interface environment would be similar in many respects to conventional GUI controls and input sequences. As a result, the implementation of these controls and features would be well within the skill of the ordinary artisan, and thus, no further detail regarding the same is necessary for a full understanding of the invention.

It is contemplated that a lens may include any number of conventional GUI controls. For example, a lens may include various conventional GUI window controls such as a close button, a minimize button, a maximize button, a title bar, resizing handles, scroll bars, drop-down menus, toolbar buttons, etc.

Figure 30:
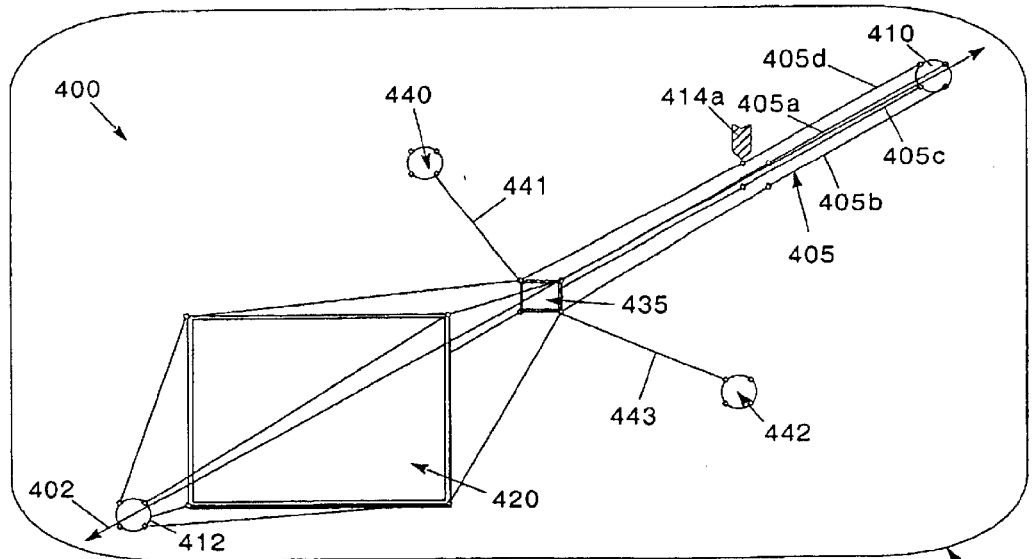
FIG. 30 is a block diagram of a computer display of FIG. 17 after minimizing a lens.

FIG. 30 illustrates a minimize operation on window 422, resulting in the window being minimized to a minor lens representation 435, which is typically an arbitrarily small object such as a small rectangle that is suitable for attachment to binder bands. Typically, any depth vector lens is converted to a minor lens when minimized or closed. In the alternative, closing a depth vector lens may instead remove the lens from the abstraction stack. Supplementary lenses may also be minimized; however, more typically the supplementary lenses are removed upon being minimized or closed.

A lens may be minimized into a minor lens through any number of user interface input, e.g., through clicking a minimize or close button on the lens. Selecting a minor lens (e.g., through single or double-clicking on the minor lens) typically results in opening the lens to a primary or secondary lens representation. Selecting a minor lens may also cause other primary and/or secondary lenses in a lens set to close.

Minor lenses may be used, for example, by an author of a body of knowledge to set up a number of predefined lenses and filter configurations that the author believes would be useful to a user of the abstraction stack. As a result, a user would be able to open the predefined lenses as desired to view different representations of the body of knowledge without specifically determining how to set up such representations.

A user may also be permitted to select a binder band (e.g., through single or double-clicking on the binder band) to open any adjacent minor lenses thereto, as well as optionally close any other lenses in the lens set. If one minor lens is opened, that lens would then become the primary lens. If more than one minor lens is opened, the lens closest to the former primary lens would then become the primary lens. In addition, if no minor lenses are adjacent a selected binder band, adjacent intersection points may be selected, and if no intersection points are adjacent a selected binder band, a help topic may be opened to instruct the user on the proper use of binder bands. In fact, a separate abstraction stack directed to how one uses and navigates in an abstraction stack may be opened, with the information relating to binder bands opened and highlighted.

Figure 31:
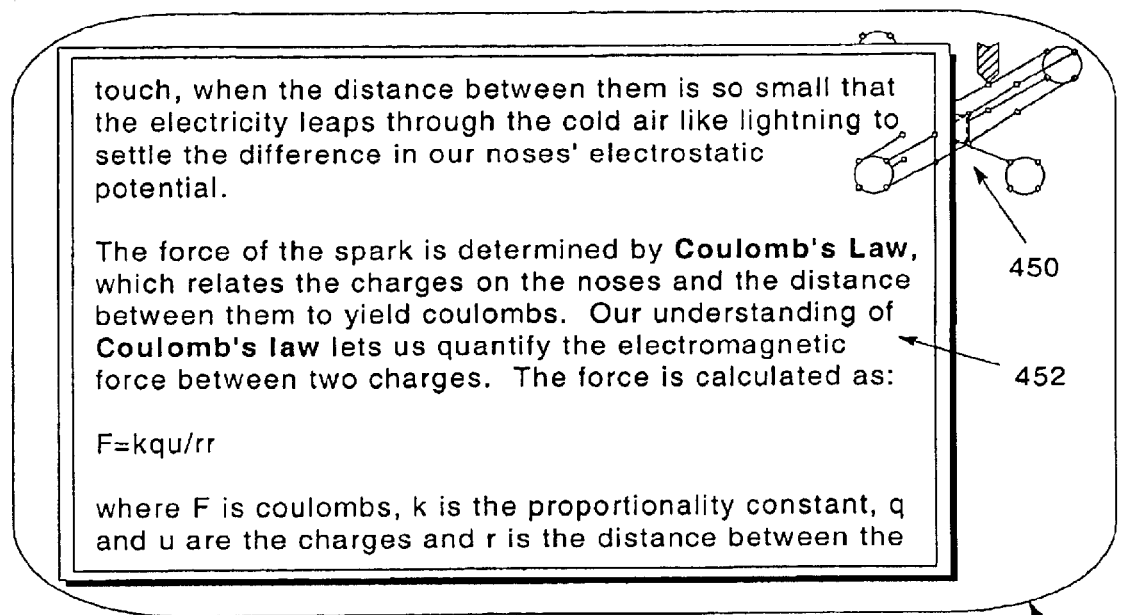
FIG. 31 is a block diagram of the computer display of FIG. 30 when in a prime lens view mode after maximizing a lens.

Lenses may also be maximized (e.g., through selection of a maximize button thereon or double-clicking on the title bar thereof), resulting in the display being switched to a prime lens view such as is illustrated in FIG. 31. In a prime lens view, the contextual relationship of the information displayed in a particular lens is temporarily hidden from the user by displaying the lens in a maximized (prime lens) representation with the remainder of the abstraction stack collapsed into a collapsed representation. For example, FIG. 31 illustrates a prime lens 452 representing a maximized representation of lens 420, with abstraction stack 400 collapsed into a collapsed representation 450.

A collapsed stack representation typically includes an arbitrarily small representation that illustrates a representation of each focal plane along a depth vector, as well as the compass handles at each end of the depth vector and any other compass handles linked to the stack. Any created lenses, with the exception of the prime lens when in the prime lens view, are represented by arbitrarily small minor lenses. In the prime lens view, the prime lens is displayed at approximately the same relative location on the depth vector as its associated lens in the normal view. Typically, user interaction with a collapsed abstraction stack is limited to manipulation using a compass handle, e.g., through selection and/or drag operations. In the alternative, the entire collapsed representation may be operated upon as a single object, or the individual components thereof may be individually manipulated.

An abstraction stack application may utilize more than one depth vector, whereby in effect multiple abstraction stacks may be displayed and accessed concurrently in the same display. Multiple abstraction stacks may also be joined to one another through a separate abstraction stack that serves as a mechanism for navigating between abstraction stacks.

The multiple abstraction stacks may be directed to separate bodies of knowledge. For example, as discussed above, a help system for an abstraction stack viewer or browser application such as described herein may be implemented itself as an abstraction stack, with the body of knowledge represented thereby related to the use and navigation through an abstraction stack.

Multiple abstraction stacks may also be directed to the same body of knowledge, but provide separate manners of viewing the information contained therein. For example, different abstraction schemes may stratify a body of knowledge into different classes of abstraction levels, e.g., with one abstraction scheme stratifying a body of knowledge into levels of abstraction based upon levels of comprehension (e.g., beginner, expert, etc.), with another abstraction scheme stratifying the body of knowledge into levels of abstraction based upon document components (e.g., body text, footnotes, headings, index terms, glossary terms, examples, figures, audio clips, video clips, etc.). Multiple abstraction level classifications may be implemented, for example, by permitting multiple level identification fields for each information element in a body of knowledge (e.g., by using separate "Ivla" and "Ivlb" fields in the "<infoel>" tag, whereby one abstraction stack would only read the "Ivla" field and the other would only read the "Ivlb" field).

The different schemes may have separate stacks, or a single filter may be configured to reflect aspects of multiple schemes. Additional tags may also be used to indicate how multiple abstraction stacks are to be linked to one another, e.g., using a tag that links together levels from different classes of abstraction levels. In the alternative, an arbitrary coupling between abstraction stacks may be provided simply to reflect that the abstraction stacks are related in some specified manner.

User interface controls may be used to represent and link together multiple abstraction stacks to be viewed on the same computer display. For example, FIG. 30 illustrates the use of additional compass handles, e.g., compass handles 440 and 442, that can extend from a particular focal plane along the depth vector to link together abstraction stack 400 with additional abstraction stacks. Strata bands, e.g., bands 441 and 443, may be used to couple the compass handles to the abstraction stack 400, although unlinked abstraction stacks may simply be represented by a single compass handle unconnected to any other object.

A compass handle utilized in this manner may be used to represent a fully minimized abstraction stack. As a result, selection of such a compass handle (e.g., through single or double-clicking) may expand the minimized stack into a collapsed stack representation (similar to representation 450 illustrated in FIG. 31).

Typically, abstraction stacks linked to one another are oriented with parallel depth vectors. If multiple abstraction stacks are displayed but are not linked together, it is still desirable if possible to orient all stacks in parallel orientations. Thus, if a minimized abstraction stack is expanded into a collapsed representation, the depth vector thereof may be oriented according to a mode or mean average of the orientations of the currently-open stacks.

Selection of a compass handle on a collapsed abstraction stack representation typically results in expansion of the abstraction stack to an expanded representation such as representation 400 illustrated in FIG. 30. Expansion of a stack may also result in the opening of default lenses. As an example, it may be desirable to open the two depth vector lenses closest to a selected compass handle and make the lens closest to the compass handle the primary lens. If no lenses were created for the abstraction stack, two lenses with default filter configurations may be created and opened (e.g., lenses that respectively pass the abstraction levels represented by the closest and next-to-closest intersection points).

Selection of a compass handle (e.g., through single or double-clicking thereon) on an expanded abstraction stack may be used to minimize the entire abstraction stack into the compass handle. In the alternative, selection of a compass handle in a similar or different manner may collapse the abstraction stack into a collapsed representation.

It is also contemplated that a compass handle may be manipulated through various drag operations (e.g., by orienting the pointer over the handle, depressing a button and moving the pointer with the button depressed).

For example, for an expanded stack, dragging a compass handle in one mode (e.g., with no control keys depressed) may move the entire abstraction stack around the display without modifying the orientation or size thereof. Dragging a compass handle in another mode (e.g., with one control key or combination depressed) may enable that compass handle to be moved with the other compass handle anchored such that the orientation and length of the depth vector may be modified. Dragging a compass handle in yet another mode (e.g., with another control key or combination depressed) may enable that compass handle to be moved only along the depth vector to in effect resize the abstraction stack without modifying the orientation thereof. Yet another mode may enable the depth vector to pivot about the other compass handle to permit reorientation without modifying the size. Dragging a compass handle on a collapsed or minimized stack may simply move the entire collapsed or minimized stack around in the display. Alternatively, similar effects may be used to alter the viewpoint for the abstraction stack similar to the field of view concept in VRML.

When in a prime lens view, dragging a compass handle may move a collapsed abstraction stack around relative to the prime lens. Moreover, if the stack is drug off of the prime lens, the display may return to normal view with the stack expanded and the formerly-prime lens set as the primary lens, with an additional lens either at a higher or lower level of abstraction opened as a secondary lens.

Individual lenses in an expanded abstraction stack may also be manipulated by a user as desired. For example, lenses may be selected to control which lens is designated the primary lens for receiving user input. In addition, movement and/or resizing of lenses may be performed. Movement or resizing of a lens in a lens set typically modifies only that lens, although group movement and resizing operations may also be supported for a lens set. However, even when a lens is resized or moved, the location of the lens along the depth vector relative to other lenses is preferably maintained so that the contextual relationship therebetween is also maintained. The position along the depth vector for a lens may be varied, but preferably not in such a manner that a lens is permitted to switch relative positions with another lens on the stack.

Movement or resizing of a lens may be performed in a number of manners consistent with the invention. For example, similar to conventional GUI windows, a lens may be moved by dragging its title bar or by using arrow keys when in a predetermined mode. Resizing of a lens typically may be performed using conventional resizing handles (e.g., by dragging the boundaries of the lens).

Typically, movement of a lens is restricted to movement within the plane of the lens—that is, a plane that is orthogonal to and disposed at a fixed depth along the abstraction axis. A separate movement operation to modify the depth of a lens may also be provided consistent with the invention, preferably with any such movement bounded by the depth of adjacent objects along the depth vector. In some applications, fully three-dimensional movement, again preferably bounded by adjacent objects, may also be permitted consistent with the invention. An attempt to move beyond the depth of an adjacent object may not be permitted, or in some applications, may result in movement of the adjacent object along the depth vector as well, so long as the relative depth between the objects is maintained. In addition, in some applications it may be permissible to modify the relative depths of lenses along the depth vector, particularly if the filter configurations therefor have been modified since initial placement of the lenses.

Various alternate movement mechanisms may also be used in addition to and/or in lieu of conventional mechanisms. One suitable manner of moving or resizing a lens is through collision of pointer with a boundary of the lens when the pointer is in a collision resizing or movement manipulation mode. With this feature, which is the subject of the aforementioned incorporated application entitled "COMPUTER SYSTEM AND METHOD OF MANIPULATING A WINDOW ON A COMPUTER DISPLAY THROUGH COLLISION WITH A POINTER", movement of a pointer along a first vector moves a boundary segment of a lens along a second vector if it is determined that the first vector intersects that boundary segment. In a movement mode, the boundary segment is moved in conjunction with all other boundary segments to effectively move the lens. In a resizing mode, other boundary segments remain fixed to effectively resize the lens. The pointer may be defined to have a single position from which the first vector extends, or in the alternative, a proximity range may be defined around the pointer, with a boundary thereof used to test for collisions with a boundary segment of a lens.

This type of pointer manipulation, which is also referred to as a "bumper-jumper" operation, typically results in the appearance of a pointer "bumping" or "pushing" a lens as the pointer collides with the lens. The mode can be selectively enabled or disabled, including a temporary enabling or disabling operation (e.g., by holding down a control key during pointer movement) that permits a user to quickly and selectively "bump" or "jump" over any given boundary as desired. In addition, collision may be selectively detected only when contacting a boundary segment from outside a lens, and/or only when contacting a boundary segment while within the boundary of a lens.

Figure 32:
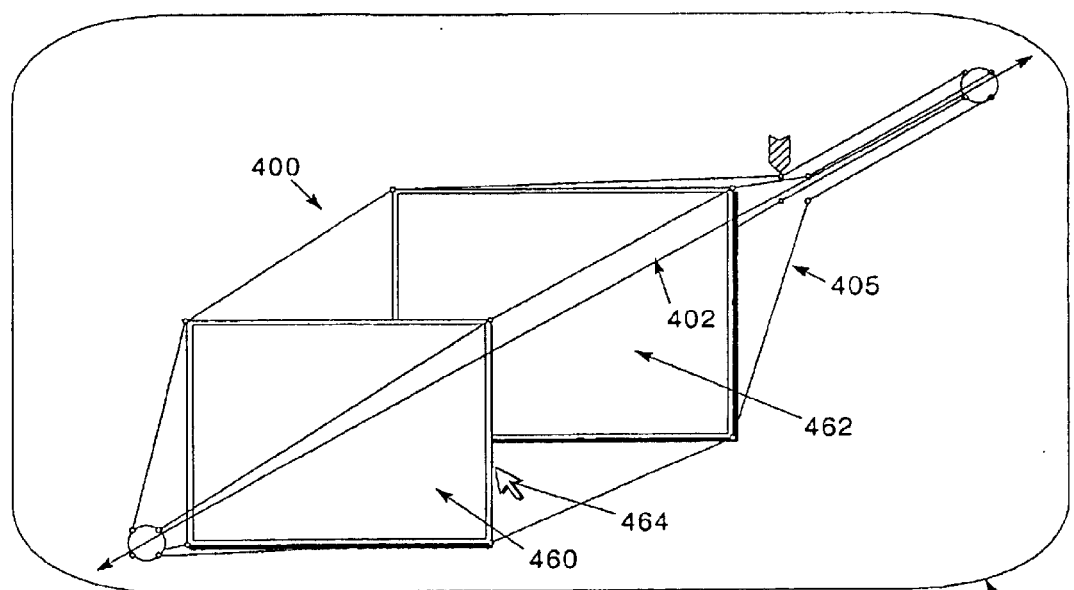
FIG. 32 is a block diagram of the computer display of FIG. 17, with a collision pointer positioned prior to a collision manipulation operation.
Figure 33:
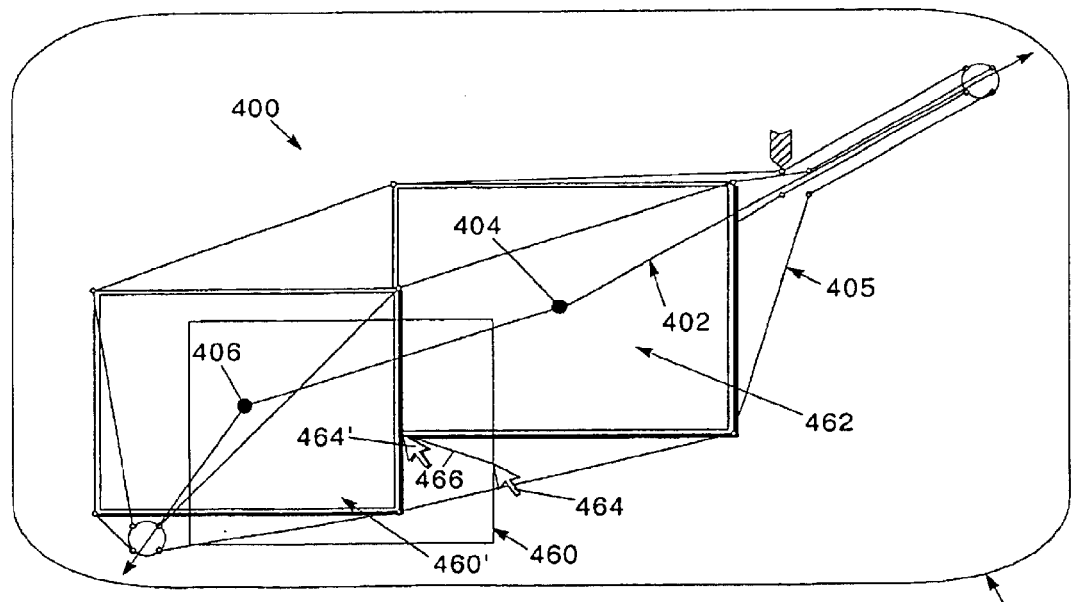
FIG. 33 is a block diagram of the computer display of FIG. 32, after movement of a lens in response to pointer movement during a collision manipulation operation.

As an example, FIG. 32 illustrates a movement operation performed on abstraction stack 400 when in a collision manipulation mode. A pair of lenses 460, 462 are illustrated as partially overlapping so that a portion of lens 462 is hidden behind lens 460. If a user wished to view the hidden information in lens 462, one manner of doing so is to collide or bump pointer 464 against the boundary of lens 460 while in a collision movement manipulation mode. As shown in FIG. 33, if pointer 464 is moved along a vector 466 to the position shown at 464', lens 460 is bumped to the position shown at 460', thereby enabling a user to view the hidden information.

In addition, as can be seen from FIG. 33, in order to permit lenses to be moved in the three dimensional space within the plane that is perpendicular to the depth vector, it may be desirable to partition the depth vector into segments extending between the centers of each object disposed thereon, and joined together at a plurality of points (e.g., points 404 and 406 on depth vector 402). Thus, a depth vector need not be purely linear, but may include a plurality of segments that together extend in a predominant direction. As such, each depth vector lens along the depth vector may still be considered to be centered on the depth vector, with the depth vector being modified as necessary to permit translational movement of lenses disposed thereon. In the alternative, lenses and other objects may have stored therewith specific offsets or separation vectors defining the separation of the objects from the depth vector along the planes thereof to permit rendering each lens in an appropriate position along the abstraction stack. Moreover, as discussed above, it is not necessary for the depth vector to even be displayed.

Another suitable manner of moving or resizing a lens that may be used in lieu of or in conjunction with collision manipulation is that of proximity manipulation, such as is described in detail in the aforementioned incorporated application entitled "COMPUTER SYSTEM AND METHOD OF MANIPULATING MULTIPLE GRAPHICAL USER INTERFACE COMPONENTS ON A COMPUTER DISPLAY WITH A PROXIMITY POINTER". When in a proximity manipulation mode, lenses within a predetermined proximity range disposed around a proximity pointer may be resized or moved as a group in response to user manipulation of the pointer, thereby permitting faster manipulation of multiple objects at once. The proximity range may be limited to a plane perpendicular to the depth vector, or may in the alternative include a depth factor related to a relative distance along the depth vector.

Figure 34:
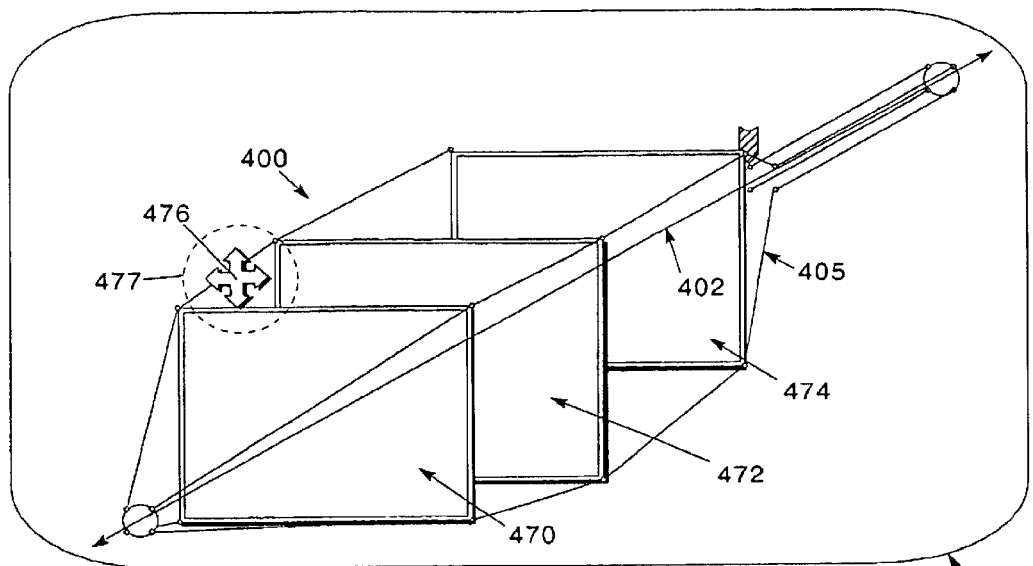
FIG. 34 is a block diagram of the computer display of FIG. 17, with a proximity pointer positioned near a pair of lenses prior to a proximity manipulation operation.
Figure 35:
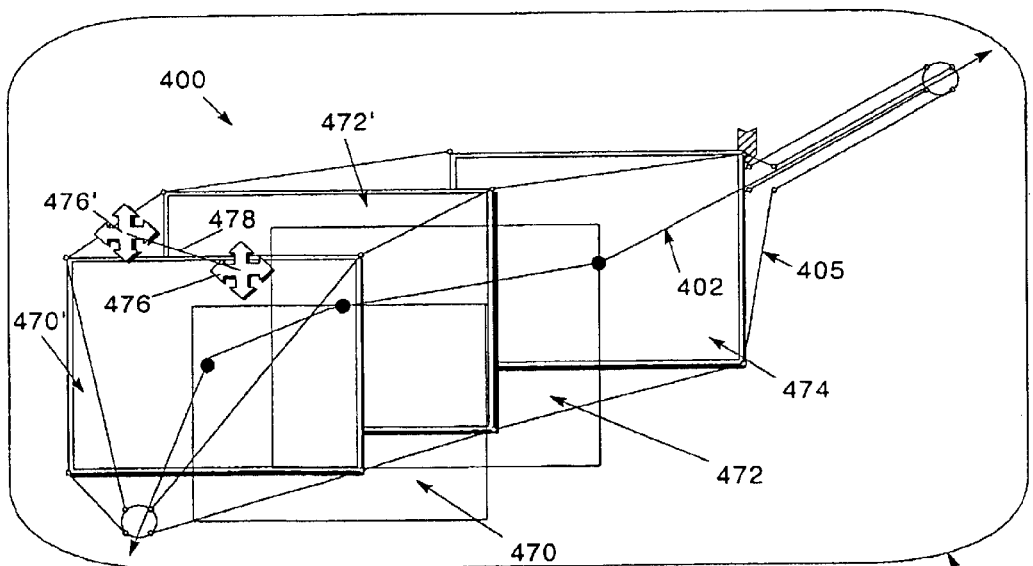
FIG. 35 is a block diagram of the computer display of FIG. 34, after movement of a pair of lenses in response to pointer movement during a proximity manipulation operation.

As an example, FIG. 34 illustrates a movement operation performed on abstraction stack 400 when in a proximity pointer mode. Three lenses 470, 472, and 474 are illustrated as partially overlapping one another so that portions of both lenses 472 and 474 are hidden from a user. If a user wishes to view the hidden information in lens 474, for example, one manner of doing so is to place pointer 476 in a proximity mode and orienting the pointer such that at least a portion of each window 470 and 472 is disposed within a proximity range 477 defined around the pointer. As shown in FIG. 35, if pointer 476 is moved along a vector 478 to the position shown at 476', lenses 470 and 472 are moved as a group into the positions shown at 470' and 472', respectively, thereby enabling a user to view the hidden information in lens 474.

It should be appreciated that other variations disclosed in these aforementioned applications may also be implemented consistent with the invention. In addition, other manners of manipulating the lenses will be apparent to one of ordinary skill in the art. For example, given that a body of knowledge may be represented in a tag-delimited format such as HTML, it should also be appreciated that hypertext links and the like may be embedded in the body of knowledge such that a user can navigate to predetermined locations in the same or different lenses specified in the embedded links simply by selecting those links. Links may also be associated with particular locations in the body of knowledge, so that each lens in a lens set is scrolled in a coordinated fashion to display its particular representation of that location in the body of knowledge. Links may also be utilized to create or open specific lenses if such lenses do not currently exist in the abstraction stack. Other user-coordinated operations may also be performed on the abstraction stack consistent with the invention.

It should further be appreciated that a number of user interface controls, objects, mechanisms, and techniques described herein may also have applicability either alone or in combination in other computer software user interfaces independent of an abstraction stack. For example, objects and techniques such as filtering, binder bands, proximity pointers, bumper-jumper pointers, link pointers, etc. may have other uses such as in the basic interface for an operating system, or in the user interface for practically any type of computer software application.

Multi-Level Authoring of Body of Knowledge

In addition to providing a unique and useful manner of viewing information from a body of knowledge, embodiments of the invention may also provide a unique manner of authoring a body of knowledge using a body of knowledge authoring process consistent with the invention. This process relies in part on a unique authoring tool that operates in much the same manner as an abstraction stack, but with the additional ability to create and modify the information in a body of knowledge through a similar type of multi-level interface.

Figure 36:
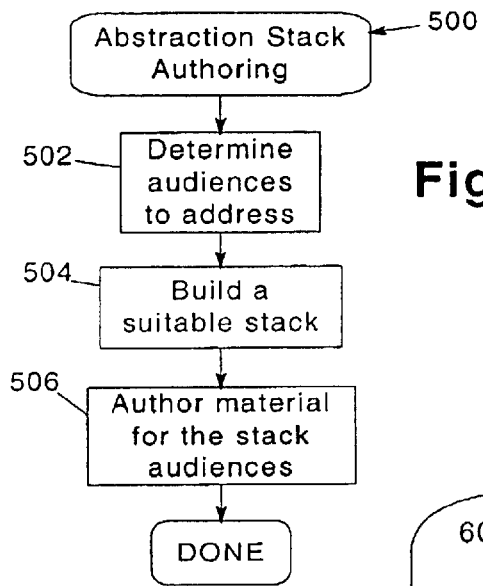
FIG. 36 is a flowchart illustrating the program flow of an abstraction stack authoring process consistent with the invention.

One suitable authoring process consistent with the invention is illustrated by abstraction stack authoring process 500 in FIG. 36. Generally, this authoring process occupies three main conceptual operations. Initially, the particular audiences that will be addressed by a body of knowledge are determined (block 502). Next, the infrastructure of a suitable abstraction stack, having levels of abstraction defined to enable presentation of the body of knowledge in different formats suitable for the different audiences, is built (block 504). Then, the material from the body of knowledge is authored by selectively inputting information into the infrastructure defined by the abstraction stack (block 506).

As to block 502, determination of the audiences to address determines how a body of knowledge will ultimately be presented to readers. As discussed above, an abstraction stack may be considered as addressing audiences with multiple levels of ability and interest. The audiences in some instances are made up of separate individuals. In other instances, a single individual's ability and interest can vary over time so that a single individual represents multiple audiences. Therefore, an author wishing to create a body of knowledge first decides which audiences to address so that a suitable stack can be built. Within the context of that stack the author can then author material appropriate for the selected audiences.

As to blocks 504 and 506, an author typically utilizes an authoring tool (e.g., as identified by block 90 in FIG. 2) to create the infrastructure of an abstraction stack and receive information into that infrastructure. Authoring tool 90 operates in much the same manner as abstraction stack application 50, and may utilize nearly all of the same user interface components and processes described above, albeit with several additional features and modifications such as the ability to add, delete and/or modify the information displayed in an abstraction stack lens. Generally, it should be appreciated that while abstraction stack application 50 is a browser- or viewer-type application, and authoring tool 90 is an editor- or authoring-type application, both types of applications may utilize many of the same underlying features, structures, routines and processes (e.g., many of the operations provided in depth manager 60 and flow manager 80). As it is typically necessary for a user to be able to view and navigate through an abstraction stack during authoring of a body of knowledge using authoring tool 90, many if not all of the features described above for abstraction stack application 50 may be useful in authoring tool 90. Therefore, the reader is directed to the discussion of abstraction stack application 50 for an understanding of the basic operation of authoring tool 90.

To create a new stack with authoring tool 90, a routine similar to initialize stack routine 150 of FIG. 6 may be executed, e.g., in response to a "new stack" request through a menu or toolbar button selection, or in other manners known in the art. When a new stack is created, the authoring tool's depth manager initializes a stack with a null body of knowledge that initially has no designated abstraction levels. Accordingly, for authoring tool 90, it may be desirable to replace block 151 of routine 150 to skip retrieval of an existing body of knowledge and instead initialize an empty data structure. In addition, it may be desirable to modify block 156 to first test for the presence of any abstraction levels so that no intersection points are created if no abstraction levels exist. In the alternative, it may be desirable for block 156 to open a dialog box that asks the author for the abstraction levels to be addressed in the body of knowledge, and then create intersection points for the abstraction levels created by the author.

Creation of a new stack may include retrieval of existing information and/or retrieval of existing levels of abstraction. For example, it may be desirable to retrieve existing information prior to creation of any levels of abstraction, whereby all of the information would essentially be unassociated. In that instance, block 151 of routine 150 could be modified to retrieve a document or file of existing information and parse the information into information elements that lack any association with a particular level of abstraction (i.e., having null level identifiers). Then, upon creation of the stack, a default editing lens could be opened with a null level identifier so that the lens displays all of the as yet unassociated information in the body of knowledge.

As another example, it may be desirable to retrieve existing levels of abstraction, with or without also retrieving existing information. This would in effect provide a template function, particularly when it is known that particular abstraction levels are best suited for a particular type of body of knowledge. As such, block 156 of routine may be modified to retrieve the levels of abstraction from a template or other source.

Moreover, similar to other types of editors, it may be desirable to load an existing body of knowledge into the authoring tool for modification and/or input of new information into the body of knowledge.

Figure 37:
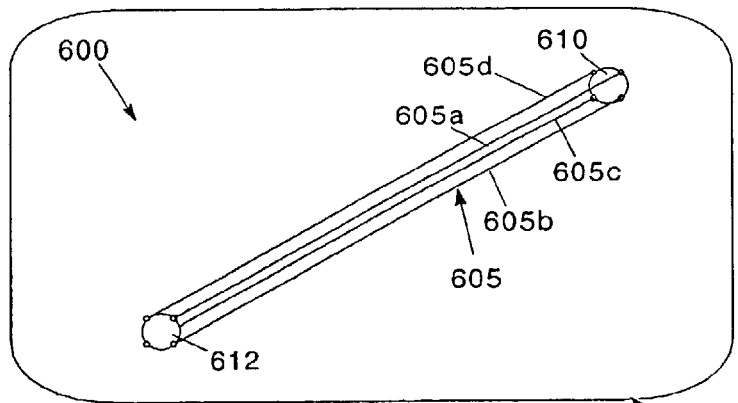
FIG. 37 is a block diagram of a computer display, illustrating the initialization of an empty abstraction stack in an abstraction stack authoring system consistent with the invention.

Assuming the a new abstraction stack is created without retrieving any existing information or abstraction levels, the abstraction stack would be represented in the manner shown by abstraction stack 600 of FIG. 37. Abstraction stack 600 typically looks similar to abstraction stack 400 of FIG. 8, except that it has no intersection points. Instead, only a pair of compass handles 610 and 612 are joined by binder bands 605 (including individual bands 605a–d).

Once an empty abstraction stack has been created, an author is then permitted to create abstraction levels in a number of manners consistent with the invention. For example, as discussed above, a single editing lens may optionally be opened and initially associated with a null abstraction level during creation of the abstraction stack. Then, through an interface provided in the lens, the abstraction levels may be created. Alternatively, a dialog box may be opened in response to user input (e.g., through a menu for the overall authoring tool) to permit editing of abstraction levels.

Figure 38:
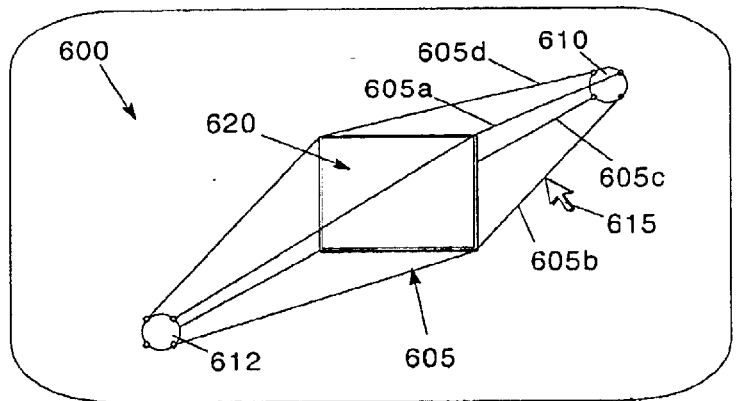
FIG. 38 is a block diagram of the computer display of FIG. 37, illustrating creation of a new editing lens.

In addition, an author may be permitted to open a new editing lens (or user input element), e.g., through clicking on a binder band while in an insert mode to indicate placement of an intersection point. The authoring tool may then respond to the click by opening a lens initialized for input of information at a null abstraction level appropriate for all readers. For example, FIG. 38 illustrates the creation of an empty lens 620 at a midpoint between compass lenses 610 and 612. The relative depth of lens 620 may be defined at a default depth (e.g., the midpoint), or at the relative location specified by the pointer during the click operation.

Figure 39:
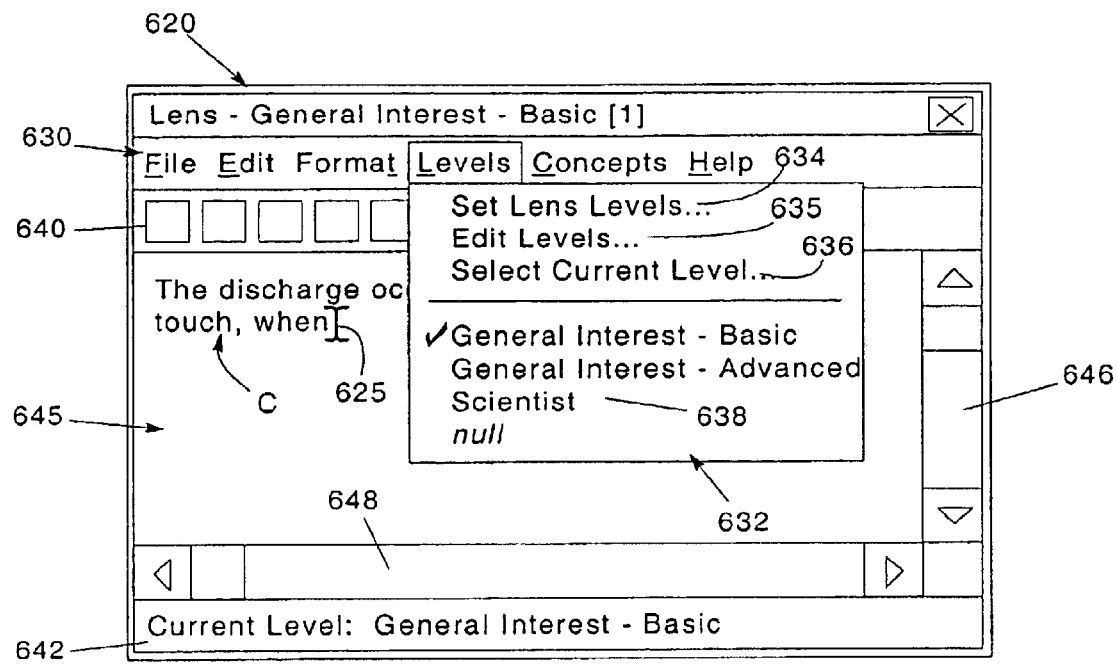
FIG. 39 is a block diagram of the editing lens of FIG. 38.

FIG. 39 illustrates an editing lens 620 in greater detail. Lens 620 generally includes a number of conventional GUI window controls, much like a lens utilized in abstraction stack 50. For example, a menu bar 630, a toolbar 640, and a status bar 642 may be provided. Also similar to a lens used in abstraction stack 50, editing lens 620 includes a panel 645 (including optional scroll bars 646, 648) through which information from the body of knowledge is presented to a reader. However, panel 645 on lens 620 additionally permits the information displayed in the panel to be modified. As such, an editing cursor 625 is illustrated in panel 645 for receiving user input into the lens.

Menu bar 630 includes conventional menu operations, e.g., for file operations, document authoring operations and help operations (e.g., as found in many conventional word processors and editors). Menu bar 630, however, also includes "levels" and "concepts" menus that define how information input into the lens is stored in the body of knowledge. The drop-down for the "levels" menu is illustrated at 632, including a "set lens levels" selection 634, an "edit levels" selection 635, "a "select current level" selection 636 and a list of defined levels 638 that can be selected via the drop-down menu to modify the current level for the lens.

Selection 634 typically opens a dialog box that permits lens 620 to be associated with one or more abstraction levels. Any number of known manners of selecting multiple items from a list of potential items may be used to select levels consistent with the invention. For example, a conventional list box or group of check boxes may be used consistent with the invention. In addition, modification of the list of abstraction levels associated with lens 620 via selection 634 typically modifies the list displayed at 638.

In this exemplary implementation, an abstraction level includes a level parameter that may be set to null or to one or more real numbers within a predetermined range (e.g., −10.00 . . . 10.00). Note that zero, which is less than one and greater than minus one, is not the same as null, which cannot be compared to any number. Through the use of the level parameter, the hierarchical relationship of the various levels defined in a body of knowledge may be established. To this extent, alternate systems of establishing a hierarchical relationship, e.g., through a sorted list, alphanumeric information, keys, integers, etc., may be used to delimit and distinguish levels of abstraction consistent with the invention.

Each abstraction level may also include a characterization or description, which is principally a convenience for the author and reader. For example, the author of a body of knowledge on professional basketball might characterize level—5 as "for general interest readers," level 0 as "for people with an interest in organized sports," level 2 as "for fans of professional basketball," and level 5 as "for people in the business of professional basketball." As another example, for the body of knowledge of Table I, level 1 may be defined as a "general interest—basic" level, with level 2 defined as a "general interest—advanced" level and level 3 defined as a "scientist" level. As noted above in conjunction with the description of configure filter dialog box 300 of FIG. 11, the characterization or description of an abstraction level may be used as a level identifier that can be selected by a user when configuring a filter.

Selection 635 opens a dialog box that enables author creation and modification of abstraction levels for the body of knowledge. Typically, capabilities for adding, editing and deleting abstraction levels is provided. Editing operations may include, for example, changing the level parameter and/or characterization or description associated therewith.

Selection 636 typically opens a dialog box that enables an author to select a current level for which to enter information into the body of knowledge. A similar operation may also be performed more quickly through an optional list 638. In either manner, selection of a new current level controls how information elements are associated with particular levels of abstraction. For example, if no information has been selected when a new level is selected, new information elements created in the lens may be assigned to the newly selected level. If existing information is selected, that information may be assigned to the selected level. Other user interface mechanisms to associate information with a level may also be used in the alternative. Moreover, it should be appreciated that lenses may be limited to receive input from one level of abstraction only, whereby selection 636 and list 638 could be omitted.

Each editing lens also includes a filter configuration similar to a lens in abstraction stack 50. In the preferred implementation, the editing lens' filter configuration always passes information for the level or levels associated with the lens. At the author's discretion, it may also pass information at other levels, and may apply focus effects to any levels as desired. A dialog box similar to dialog box 300 of FIG. 11 may be used to set the filter configuration for an editing lens. Typically, a new lens is defined with a filter configuration that passes (without a focus effect) only the levels associated with the lens.

Typically, but not necessarily, whenever a first new lens is opened in the abstraction stack, an author will first create one or more abstraction levels for the body of knowledge, e.g., using the dialog box accessed via selection 635. In the alternative, an abstraction level could be created by clicking on a binder band when in a predetermined mode. In response to such user selection, a level may be created having a level parameter set to the relative position of the pointer along the depth vector, or set to the midpoint between the opposing adjacent objects (intersection points, lenses, and/or compass lenses) existing along the depth vector relative to the position of the click. Moreover, it may be desirable to open a dialog box that enables a user to edit the level, e.g., to input a characterization or description thereof.

In conjunction with creating any abstraction levels, authoring tool 90 also preferably creates intersection points corresponding to the new abstraction levels, and refreshes the abstraction stack to display those intersection points. Intersection points may be evenly dispersed along the depth of the depth vector, or in the alternative, may be located depending upon the relative location of the level parameter therefor within the acceptable range of levels defined for the body of knowledge. Intersection points relating to a null abstraction level may be located at a midpoint or any other arbitrary location along the depth vector, or may be omitted. In the preferred implementation the intersection point for the null abstraction level has a unique graphical representation distinguishing the intersection point from those of other abstraction levels.

Figure 40:
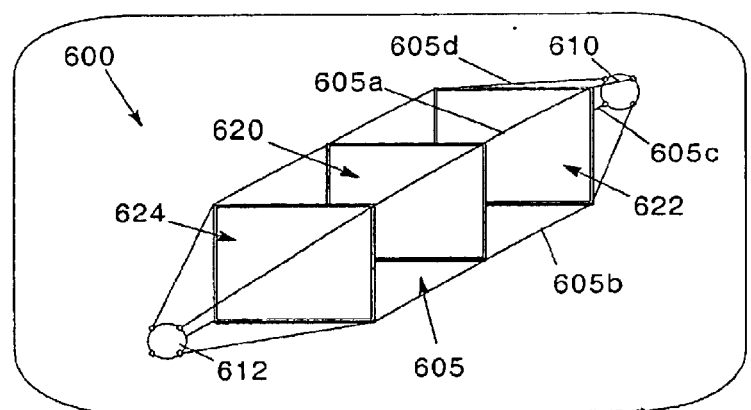
FIG. 40 is a block diagram of the computer display of FIG. 38, illustrating creation of two additional editing lenses.

Once at least a portion of the abstraction levels for a body of knowledge have been defined, it is often preferable to open multiple lenses associated with different levels of abstraction so that a body of knowledge may be generated while viewing the overall hierarchical relationship of information elements within the body of knowledge. Creation of additional lenses may be performed, for example, as shown in FIG. 38 by clicking on binder bands in a predetermined mode (e.g., by orienting pointer 615 on a binder band 605 and depressing the mouse button). FIG. 40, for example, illustrates two additional editing lenses 622 and 624 that were created via selection of the binder bands on each side of lens editing 620.

Typically, the levels associated with adjoining intersection points if any in an abstraction stack will affect initialization of a new editing lens. When there is only one adjoining intersection point, for example, the initial level for the new lens is set as follows: if the adjoining intersection point's level is null, the new lens level is also initially null. If the adjoining intersection point's level is non-null, the new lens level is initially set mid-way between the non-null level and the level range bound associated with the compass handle at the end of a directed line segment extending from the non-null intersection point through the click-point. When there are two adjoining intersection points, the level for the new lens is determined as follows: If both levels are non-null, the new lens' level is set mid-way between the adjoining levels. If no mid-point is available, the author is asked to choose between the adjoining levels. If one adjoining intersection point has a non-null level and the other has a null level, the null level is ignored and the initial level for the new lens is set as though there were only one adjoining intersection point.

Once a lens has been opened and optionally configured as outlined above, the author can then either begin entering information into the lens or close the lens. When the lens closes, it is represented on the stack as an insertion point as shown in FIG. 8.

Once the abstraction levels are defined and intersection points established, an author may open one or more lenses and begin to input information. Information input through a lens is associated with the lens' current abstraction level (if multiple levels are assigned to a lens) or with the lenses sole abstraction level (if one level is assigned to a lens). The information input into a particular lens is designated as appropriate for the audience for the abstraction level. Moreover, it may be possible to associate an information element with one or more named concepts, as discussed below.

Figure 41:
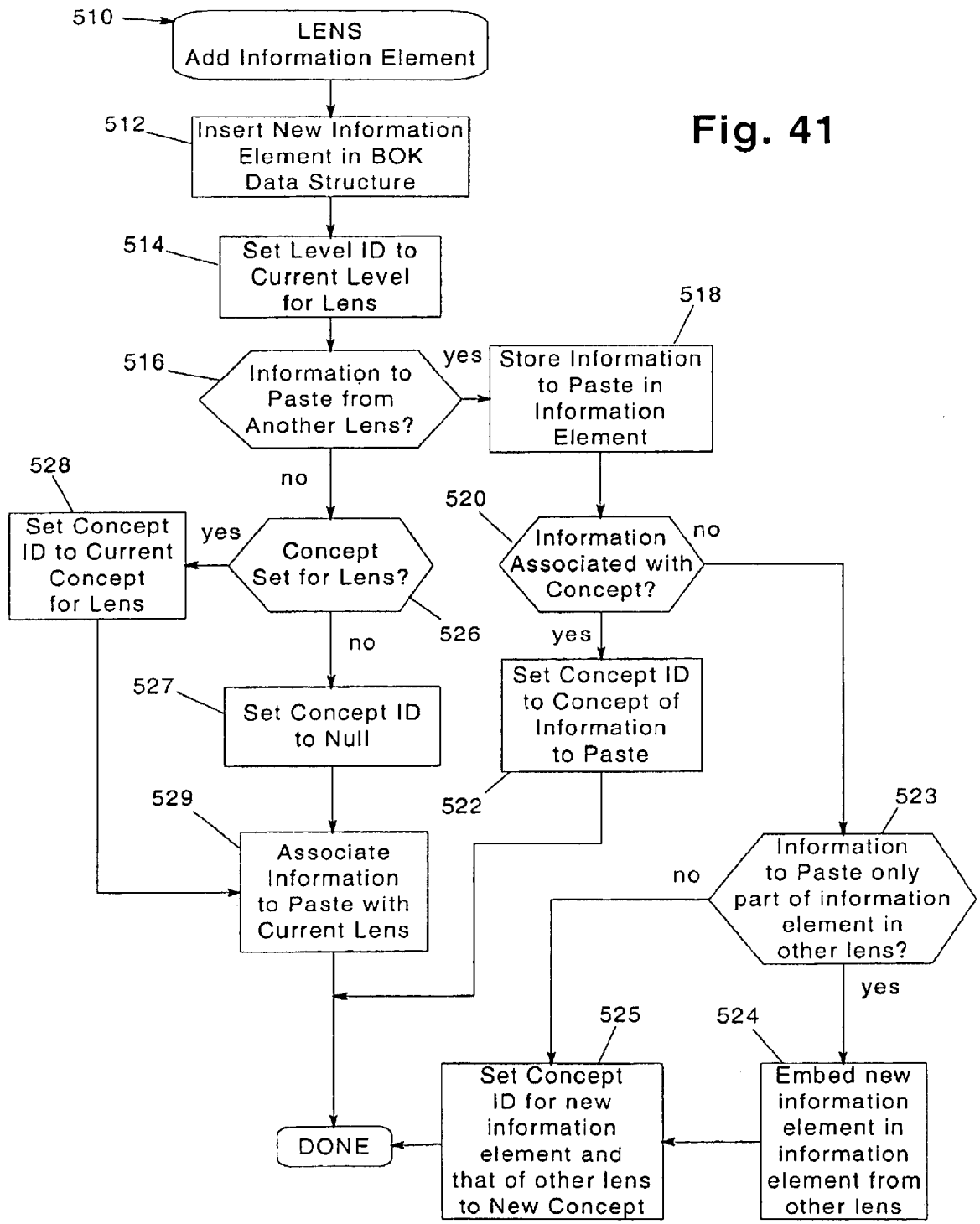
FIG. 41 is a flowchart illustrating the program flow of an add information element routine consistent with the invention.

Information may be added to a body of knowledge using an add information element routine 510 as illustrated in FIG. 41. Routine 510 may be called in response to a number of user interactions. For example, a new information element may be specifically opened by a user. In the alternative, new information elements may be added automatically in response to particular activities.

As another example, information elements could be partitioned via hard returns, whereby routine 510 could be initiated each instance of an enter key depression by a user when in an editing mode. In addition, attempts to insert or paste information into a body of knowledge may call routine 510 to build an information element for the information to be inserted or pasted. Other manners will be apparent to one of ordinary skill in the art.

It is assumed that routine 510 is executed by an editing lens that has received new information for which it is desired to input into the body of knowledge. Routine 510 begins in block 512 by inserting a new information element in the body of knowledge data structure, in the general manner outlined above.

Next, the level identifier is set to the current level established for the lens—either a single level or one of a plurality or range of levels in the set of levels established for the lens—in block 514. Selection of one of a plurality of levels may be performed, for example, via menu selection 636 or list 638. In the alternative, specific control key combinations may be used to switch the current level, or even specific formatting can be used during entry of information to designate that information for a particular level (e.g., underlined for one level and bolded for another level, etc.).

Cutting, copying and pasting operations are preferably supported by authoring tool 90. Cutting and copying, however, perform different underlying operations on a body of knowledge. In particular, a cutting operation on a lens typically removes the information from an information element, and may even remove the underlying information element from the body of knowledge data structure. In either instance, any level designations for the cut information are discarded. However, a copying operation typically copies the information from an information element but does not affect the information element itself, such that the level designations for the underlying information element or elements are unchanged.

A primary paste operation typically creates a new information element in the target editing lens, pasting clipboard information into the new information element and designating the information as appropriate for the editing lens' current abstraction level. Thus, there typically is no need for block 514 of routine 510 to separately handle the designation of levels for paste operations. In addition, it may be desirable to include a secondary paste operation that enables new information to be pasted into an existing information element, whereby only a modification to the existing information element would be needed, and routine 510 would not be required.

The authoring tool may also automatically associate concept identifiers with information elements when they are copied between lenses. Conventional versioning algorithms can be used to minimize the storage required for maintaining multiple abstractions of a named concept.

As an alternative to copying and pasting, the author can select information and designate it as a named concept. Selection is accomplished in any number of manners, e.g., using a keystroke combination, specific formatting or a menu selection (such as through the "concepts" menu on menu bar 630) to designate a current named concept. Information input in other lenses while the named concept remains current may be associated with the same concept identifier. The information may also be selection-highlighted in the selection lens as long as the named concept remains current. Information input in the other lenses may be link-pointer highlighted as it is input. It remains link-pointer highlighted as long as the named concept remains current. The named concept may also remain current until the author deselects the information in a conventional manner.

Returning to FIG. 41, block 516 next determines whether any information was passed from another editing lens for pasting into the new information element. If so, block 518 is called to store the information to be pasted in the new information element. Next, block 520 determines whether that information is associated with a particular concept—namely whether the information to be pasted came from an information element associated with a named concept. If so, the concept identifier is set to that of the information to be pasted in block 522, and routine 510 is complete. If not, control is passed to block 523 to determine whether the information to paste forms only a portion of an information element in the lens from which the information was cut or copied. If so, a new information element is embedded into the information element from which the information was retrieved, in block 524. Then, block 525 sets the concept identifier for the new information element in the current lens as well as that of the information element cut or copied from is set to a new concept in block 525 and the routine terminates. Returning to block 523, if the information to paste forms all of an information element in the other lens, control is passed directly to block 525.

The new named concept may be set to a default or generated value, or may be set to null. Moreover, in some applications a dialog box may be opened prompting the user to input a new named concept or select from a list of available named concepts. It should be appreciated, however, that no user selection of a named concept may be required as a user may not need to know the actual names, descriptions or identifiers of concepts so long as appropriate information is linked as described herein.

Returning to block 516, if the information (if any) to insert is not from another lens, control passes to block 526 to determine whether a specific named concept is set for the current editing lens. If so, block 528 sets the concept identifier to that of the lens, and if not, block 527 sets the concept identifier to null. Regardless, however, control passes from blocks 527 and 528 to associate the information to be pasted with the current lens. As such, subsequent paste attempts with the same information will be handled as begin associated with another lens through the sequence of instructions outlined at block 518. Next, routine 510 is then complete, with the level and concept identifiers set to the extent possible based upon all known information in the system. A concept may be set for a lens in any number of user actions known in the art, e.g., through a list or menu selection (such as through the "concepts" menu on menu bar 630), through pointer selection of information, or in any manner described above with regard to maintaining levels and level identifiers for a body of knowledge.

It should also be appreciated that, concurrently with receiving input into an editing lens, authoring tool 90 preferably automatically updates the contents of other open lenses based upon the filter configurations therefor. This may be performed, for example, by issuing update events to each open editing lens after creation or modification of an information element to in effect execute either of the fill lens or update contents routines for each open editing lens, in the general manner described above.

Consequently, when using the above-identified authoring tool, a user is able to relatively easily construct a body of knowledge data structure via the concurrent input of information to more than one editing lens. Moreover, by using suitable filter criteria, the contextual relationship of new and existing information can be visualized both during and after creating of a body of knowledge—even if an author is not permitted to edit information displayed from the body of knowledge as a non-editable element respective to a given editing lens. For example, a lens may display information elements from first and second levels (whether in separate or similar formatting), but only allow editing to be performed for information elements associated with the first level. Nonetheless, authoring is facilitated because the contextual relationship of information from the different levels is concurrently presented.

It should also be appreciated that various conventional editing functions may be utilized to create a custom body of knowledge consistent with the invention, e.g., to delete or modify information elements, to format information within the elements, to insert objects (e.g., multimedia or executable objects), files or documents, etc. Moreover, while the above-described authoring tool builds a body of knowledge directly into a data structure such as is illustrated in FIG. 3, it should be appreciated that an authoring tool may build and manipulate a tag-delimited text file and/or perform conversion between either of the formats, consistent with the invention.

Various additional modifications may be made to the embodiments described herein without departing from the spirit and scope of the invention. Therefore, the invention lies solely in the claims hereinafter appended.

What is claimed is:

1. A method of accessing selected information from a body of knowledge stored in a computer system, the body of knowledge stratified into a plurality of levels of abstraction, the method comprising:

(a) concurrently displaying first and second information elements in first and second lenses on a computer display, respectively, the first and second information elements respectively associated with first and second levels of abstraction in the body of knowledge;

(b) visually linking the first and second information elements displayed on the computer display in a three dimensional workspace to represent a hierarchical arrangement of the first and second levels of abstraction, wherein visually linking the first and second information elements includes orienting the first and second lenses along an abstraction axis, the abstraction axis oriented generally perpendicular to the first and second lenses;

(c) applying a first filter criteria associated with the first lens to the plurality of information elements to generate a first set of filtered information elements;

(d) applying a second filter criteria associated with the second lens to the plurality of information elements to generate a second set of filtered information elements;

(e) displaying the first set of filtered information elements in the first lens; and (f) displaying the second set of filtered information elements in the second lens.

2. The method of claim 1, wherein applying the first filter criteria filters out information elements associated with at least one predetermined level of abstraction.

3. The method of claim 1, wherein applying the first filter criteria applies a focus effect to information elements associated with at least one predetermined level of abstraction, and wherein displaying the first set of filtered information elements includes displaying the information elements associated with the predetermined level of abstraction with a visually distinct representation.

4. A method of accessing selected information from a body of knowledge stored in a computer system, the body of knowledge stratified into a plurality of levels of abstraction, the method comprising:
   (a) concurrently displaying first and second information elements in first and second lenses on a computer display, respectively, the first and second information elements respectively associated with first and second levels of abstraction in the body of knowledge;
   (b) visually linking the first and second information elements displayed on the computer display in a three dimensional workspace to represent a hierarchical arrangement of the first and second levels of abstraction, wherein visually linking the first and second information elements includes orienting the first and second lenses along an abstraction axis, the abstraction axis oriented generally perpendicular to the first and second lenses;
wherein the first and second lenses each display a current location in the body of knowledge, the method further comprising, in response to a user manipulating the first lens to display a predetermined location in the body of knowledge, updating the second lens to display the same predetermined location in the body of knowledge.

5. A method of accessing selected information from a body of knowledge stored in a computer system, the body of knowledge stratified into a plurality of levels of abstraction, the method comprising:
   (a) concurrently displaying first and second information elements in first and second lenses on a computer display, respectively, the first and second information elements respectively associated with first and second levels of abstraction in the body of knowledge, and the first and second information elements associated with a common concept in the body of knowledge;
   (b) visually linking the first and second information elements displayed on the computer display in a three dimensional workspace to represent a hierarchical arrangement of the first and second levels of abstraction, wherein visually linking the first and second information elements includes orienting the first and second lenses a long an abstraction axis, the abstraction axis oriented generally perpendicular to the first and second lenses, and wherein visually linking the first and second information elements includes highlighting the first information element displayed in the first lens in response to user selection of the second information element in the second lens.

6. A computer-implemented method of organizing information from a body of knowledge into a plurality of levels of abstraction, the method comprising:
   (a) concurrently presenting a user with first and second user input elements, the first and second user input elements respectively associated with first and second levels of abstraction, and the first and second user input elements positioned within a three dimensional workspace to represent a hierarchical arrangement between the first and second levels of abstraction;
   (b) receiving a first information element as user input to the first user input element;
   (c) receiving a second information element as user input to the second user input element;
   (d) storing the first information element in the computer system, including associating the first information element with the first level of abstraction; and
   (e) storing the second information element in the computer system, including associating the second information element with the second level of abstraction.

7. The method of claim 6, further comprising displaying the first and second information elements on a computer display, including:
   (a) retrieving the first and second information elements from the computer system; and
   (b) displaying each of the first and second information elements in at least one of first and second lenses based upon the association of each information element with the first and second levels of abstraction.

8. The method of claim 7, wherein each lens has associated therewith a filter criteria that selectively filters out information elements associated with at least one level of abstraction.

9. The method of claim 8, wherein the filter criteria selectively applies a focus effect to information elements associated with at least one level of abstraction.

10. The method of claim 6, wherein the first and second user input elements each include a window.

11. The method of claim 6, wherein the first and second user input elements each have associated therewith a filter criteria, the filter criteria associating the user input element with at least one level of abstraction, wherein associating the first and second information elements is performed in response to the filter criteria for the first and second user input elements.

12. The method of claim 11, further comprising setting the filter criteria for the first user input element in response to user input.

13. The method of claim 11, wherein the filter criteria for the first user input element passes the first and second levels of abstraction, the method further comprising further associating the first information element with the second level of abstraction.

14. The method of claim 11, wherein the filter criteria for the first user input element passes the first and second levels of abstraction, the method further comprising:
   (a) receiving a third information element as user input to the first user input element; and
   (b) associating the third information element with at least one of the first and second levels of abstraction in response to user input.

15. The method of claim 14, wherein the filter criteria for the first user input element includes a focus effect associated with the second level of abstraction, the method further comprising displaying the third information element in the first user input element with the focus effect applied thereto.

16. The method of claim 11, further comprising, in response to user input of a third information element into one of the first and second user input elements, updating the other of the first and second user input elements to display the third information element if the filter criteria for the other of the first and second user input elements passes the third information element.

17. The method of claim 6, further comprising associating the first information element with a predetermined concept.

18. The method of claim 17, further comprising setting the predetermined concept in response to user selection of an information element displayed in at least one of the first and second user input elements.

19. The method of claim 17, further comprising setting the predetermined concept in response to a copy or cut operation.

* * * * *

UNITED STATES PATENT AND TRADEMARK OFFICE
CERTIFICATE OF CORRECTION

PATENT NO. : 6,874,123 B1
DATED : March 29, 2005
INVENTOR(S) : George Francis DeStefano It is certified that error appears in the above-identified patent and that said Letters Patent is hereby corrected as shown below:

Column 45,
Line 49, "a long" should be -- along --.

Signed and Sealed this

Twenty-sixth Day of July, 2005

JON W. DUDAS
*Director of the United States Patent and Trademark Office*